(12) United States Patent
Wittenbreder, Jr.

(10) Patent No.: US 11,515,789 B2
(45) Date of Patent: Nov. 29, 2022

(54) ZERO VOLTAGE SWITCHING FLYING CAPACITOR POWER CONVERTERS

(71) Applicant: Ernest Henry Wittenbreder, Jr., St. Petersburg, FL (US)

(72) Inventor: Ernest Henry Wittenbreder, Jr., St. Petersburg, FL (US)

(*) Notice: Subject to any disclaimer, the term of this patent is extended or adjusted under 35 U.S.C. 154(b) by 41 days.

(21) Appl. No.: 17/248,619

(22) Filed: Jan. 30, 2021

(65) Prior Publication Data

US 2022/0247310 A1 Aug. 4, 2022

(51) Int. Cl.
*H02M 3/158* (2006.01)
*H02M 1/00* (2006.01)
*H02M 3/156* (2006.01)

(52) U.S. Cl.
CPC ......... *H02M 3/158* (2013.01); *H02M 1/0058* (2021.05); *H02M 1/0048* (2021.05); *H02M 3/156* (2013.01)

(58) Field of Classification Search
CPC ............. H02M 1/0048; H02M 1/0054; H02M 1/0058; H02M 1/0074; H02M 3/1555; H02M 3/156; H02M 3/158; H02M 3/335; H02M 3/33546
See application file for complete search history.

(56) References Cited

U.S. PATENT DOCUMENTS

| | | | | |
|---|---|---|---|---|
| 10,651,731 | B1* | 5/2020 | Rainer | H02M 3/1588 |
| 2014/0346962 | A1* | 11/2014 | Sanders | H02M 1/4208 |
| | | | | 315/193 |
| 2017/0338748 | A1* | 11/2017 | Liang | H02M 3/33569 |
| 2020/0076301 | A1* | 3/2020 | Zhuang | H02M 3/158 |

FOREIGN PATENT DOCUMENTS

| | | | | |
|---|---|---|---|---|
| CN | 108281993 | * | 7/2018 | H02J 7/0016 |
| CN | 110268616 | * | 9/2019 | H02M 3/33569 |
| KR | 102371910 | * | 3/2022 | H02M 1/0058 |

* cited by examiner

*Primary Examiner* — Matthew V Nguyen

(57) ABSTRACT

Circuit structures and methods are described for achieving zero voltage switching in flying capacitor converters for both isolated and non-isolated applications. A first method is described in which zero voltage switching is achieved by operating the circuit with a variable frequency so that each switch in its on state remains on until the magnetizing current in a main inductor is reversed to a current magnitude sufficient to drive a zero voltage switching transition for a main switch. A second method is implemented with a main coupled inductor wherein a winding current is reversed and energy in a leakage inductance drives a zero voltage switching transition for a main switch. A third method is implemented with auxiliary inductors, auxiliary switches, and auxiliary capacitors which reverse the current in the auxiliary inductor which provides the necessary energy for driving a zero voltage switching transition for a main switch.

10 Claims, 26 Drawing Sheets

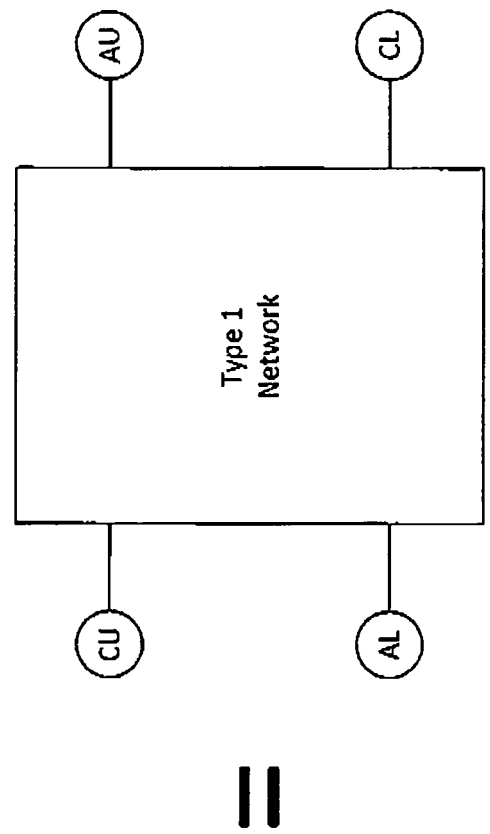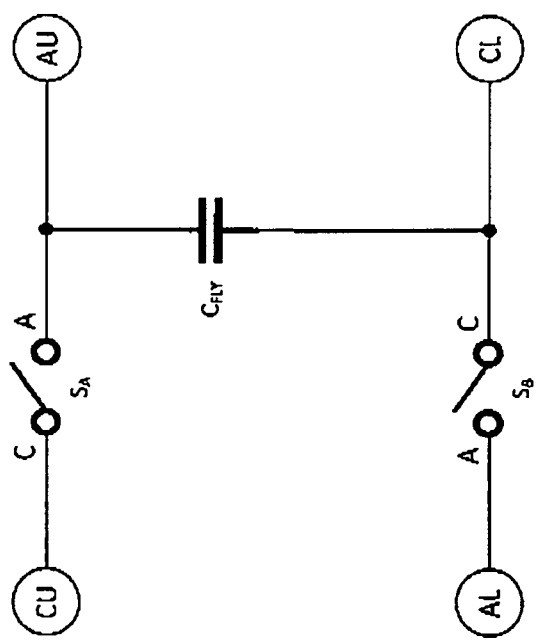
Figure 4

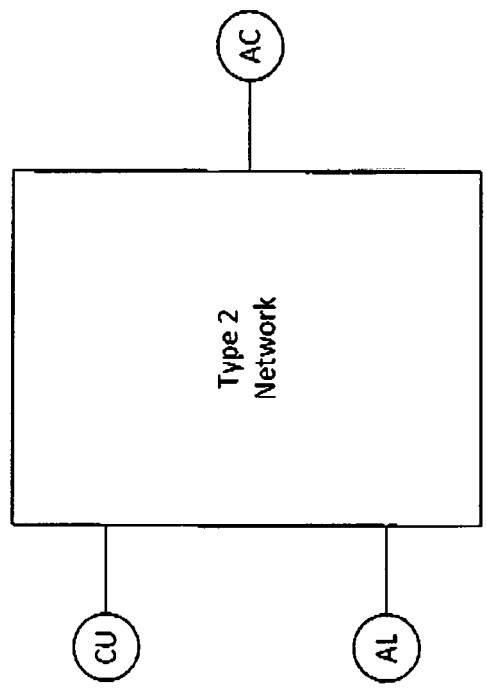
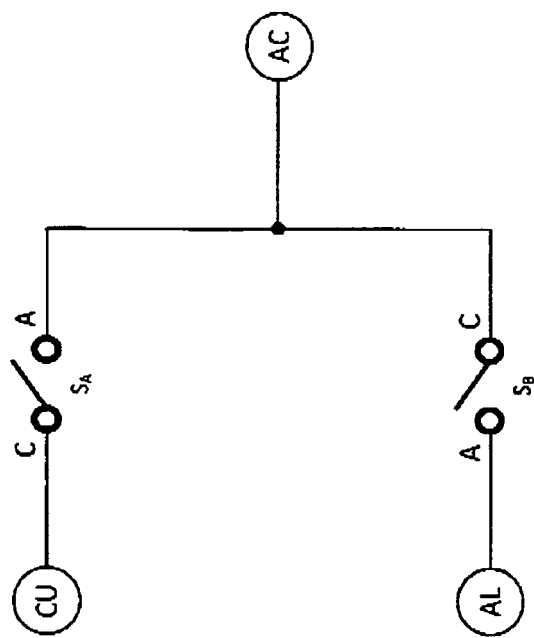
Figure 5

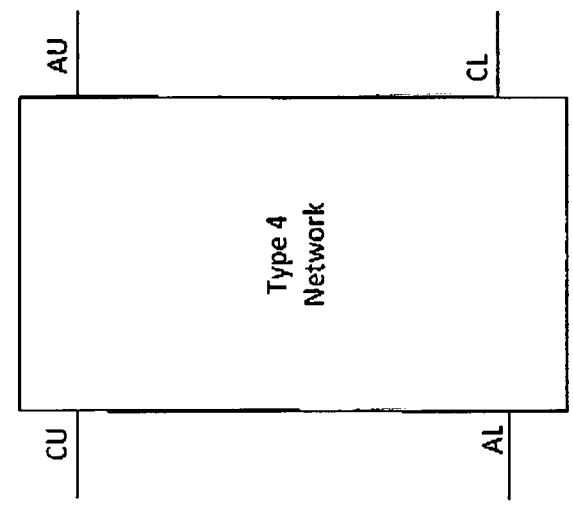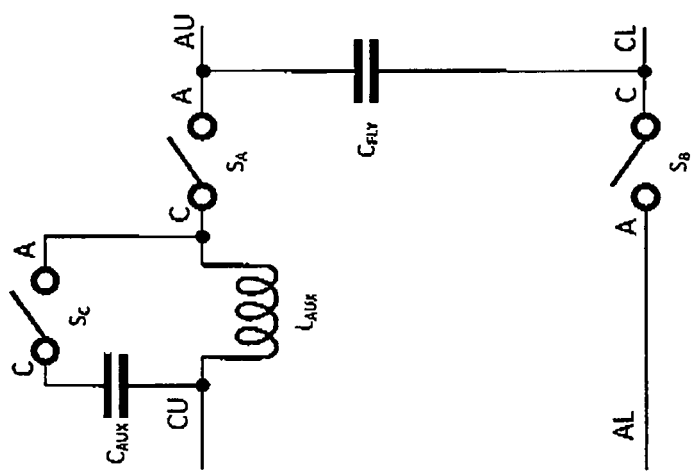
Figure 16

ZERO VOLTAGE SWITCHING FLYING CAPACITOR POWER CONVERTERS

BACKGROUND OF THE INVENTION

Field of the Invention

The subject invention generally pertains to electronic power conversion circuits, and, more specifically, to high frequency, switched mode electronic power converters. The subject matter relates to new circuits and techniques for achieving higher efficiency and higher power density in non-isolated dc to dc power converters compared to prior art power converters.

Description of Related Art

Studies and real world examples have shown that non-isolated power converters with magnetic energy storage elements having large step down or step up voltage conversion ratios have high component stresses compared to power converters with smaller ratios at equivalent power levels. As a result, magnetic energy storage converters with higher step up or step down ratios have greater component power losses, lower efficiencies, and higher failure rates. Magnetic component stresses dictate the size and efficiency of the magnetic components. Flying capacitor converters have been shown to reduce the magnetic component size and improve efficiency by reducing the voltage stress of the magnetic elements. FIG. 1 illustrates a flying capacitor converter according to the prior art. The FIG. 1 converter sets output voltage by both duty cycle and switch configuration. In the FIG. 1 circuit switch $S_{1A}$ operates in anti-synchronization to switch $S_{1B}$, switch $S_{2A}$ operates in anti-synchronization to switch $S_{2B}$, and switch $S_{3A}$ operates in anti-synchronization to switch $S_{3B}$. The node M voltage is determined by the number of A switches which are on. The voltage applied to $C_{FLY1}$ is $\tfrac{2}{3} V_{IN}$ and the voltage applied to $C_{FLY2}$ is $\tfrac{1}{3} V_{IN}$. When all 3 A switches are on and all 3 B switches are off the node M voltage is $V_{IN}$. When two A switches are on and one B switch is on the node M voltage is $\tfrac{2}{3} V_{IN}$. When one A switch is on and two B switches are on the node M voltage is $\tfrac{1}{3} V_{IN}$. When all 3 A switches are off and all three B switches are on the node M Voltage is 0. The system can alternate with a duty cycle of D between one of the switch configurations with one A switch on to the switch configuration with all B switches on to generate an output voltage between $\tfrac{1}{3} V_{IN}$ and 0. If the circuit alternated with duty cycle D between a switch configuration with two A switches on and a switch configuration with one A switch on then the output voltage would be in the range of $\tfrac{1}{3} V_{IN}$ to $\tfrac{2}{3} V_{IN}$. Compared to a buck converter with just two switches the flying capacitor converter of FIG. 1 dramatically reduces the voltage stress on the inductor enabling the use of a much smaller inductor, both in terms of inductance value, and size and weight of the inductor. Since magnetic component volume has a large impact on total power converter size and weight one can see how the application of a flying capacitor converter can positively affect the total power converter size. Another advantage is that the number of turns in the inductor for the standard buck converter would be much larger and the winding capacitance would also be larger which will have an effect on operating frequency. In general the operating frequency can be made to be higher for a flying capacitor converter. The flying capacitor converter increases the number of capacitors, but, since energy storage density in capacitors is much higher than energy storage density in magnetic elements the result is higher total energy storage density and smaller total volume.

FIG. 2 illustrates a wave form for the inductor current in a flying capacitor converter according to the prior art. The wave form indicates a uni-directional current implying a hard switching converter in which at least one of the main switches must be turned on with a considerable voltage applied to the switch thereby incurring significant switching losses during the turn on transition. What is needed to make flying capacitor converters more compelling are mechanisms to reduce or eliminate switching power losses.

Objects and Advantages

An object of the subject invention is to reveal a power conversion system for achieving higher power density than prior art power conversion systems.

Another object of the subject invention is to reveal power conversion systems with higher efficiency than the prior art.

Another object of the subject invention is to reveal a power conversion system that can achieve lower size, lower cost, and higher power density.

Another object of the subject invention is to reveal a power conversion system with reduced component stresses.

Further objects and advantages of my invention will become apparent from a consideration of the drawings and ensuing descriptions.

These and other objects of the invention are provided by novel circuits and techniques that enable elimination of power stage switching losses in flying capacitor power converters.

BRIEF DESCRIPTION OF THE DRAWINGS

The present invention is illustrated by reference to the drawings.

FIG. 4 illustrates type 1 networks used in the formation of flying capacitor converters according to the subject invention.

FIG. 5 illustrates type 2 networks used in the formation of flying capacitor converters according to the subject invention.

FIG. 16 illustrates a type 4 network according to the subject invention.

SUMMARY

The subject invention reveals new circuits and techniques for achieving elimination of power stage switching losses without incurring higher switch voltage stress in flying capacitor power converters.

DESCRIPTION OF THE PREFERRED EMBODIMENTS

Figure 1:
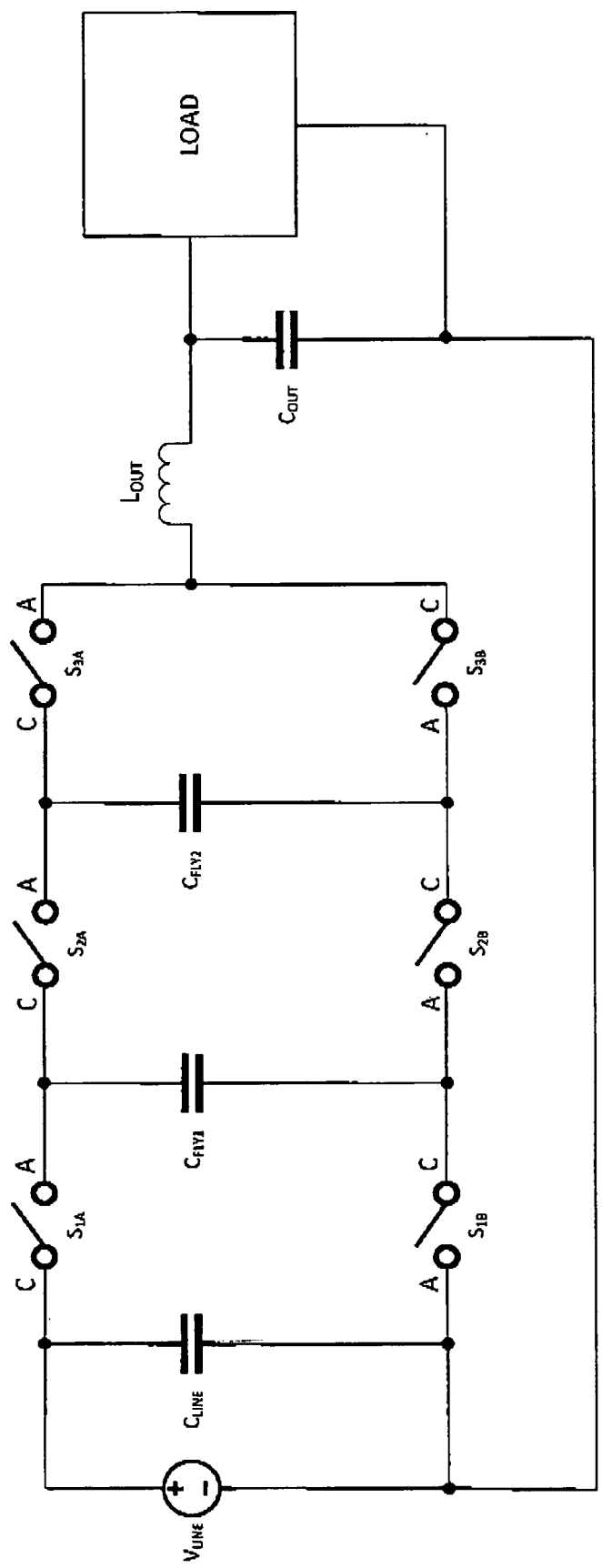
FIG. 1 illustrates a hard switching flying capacitor converter according to the prior art.
Figure 2:
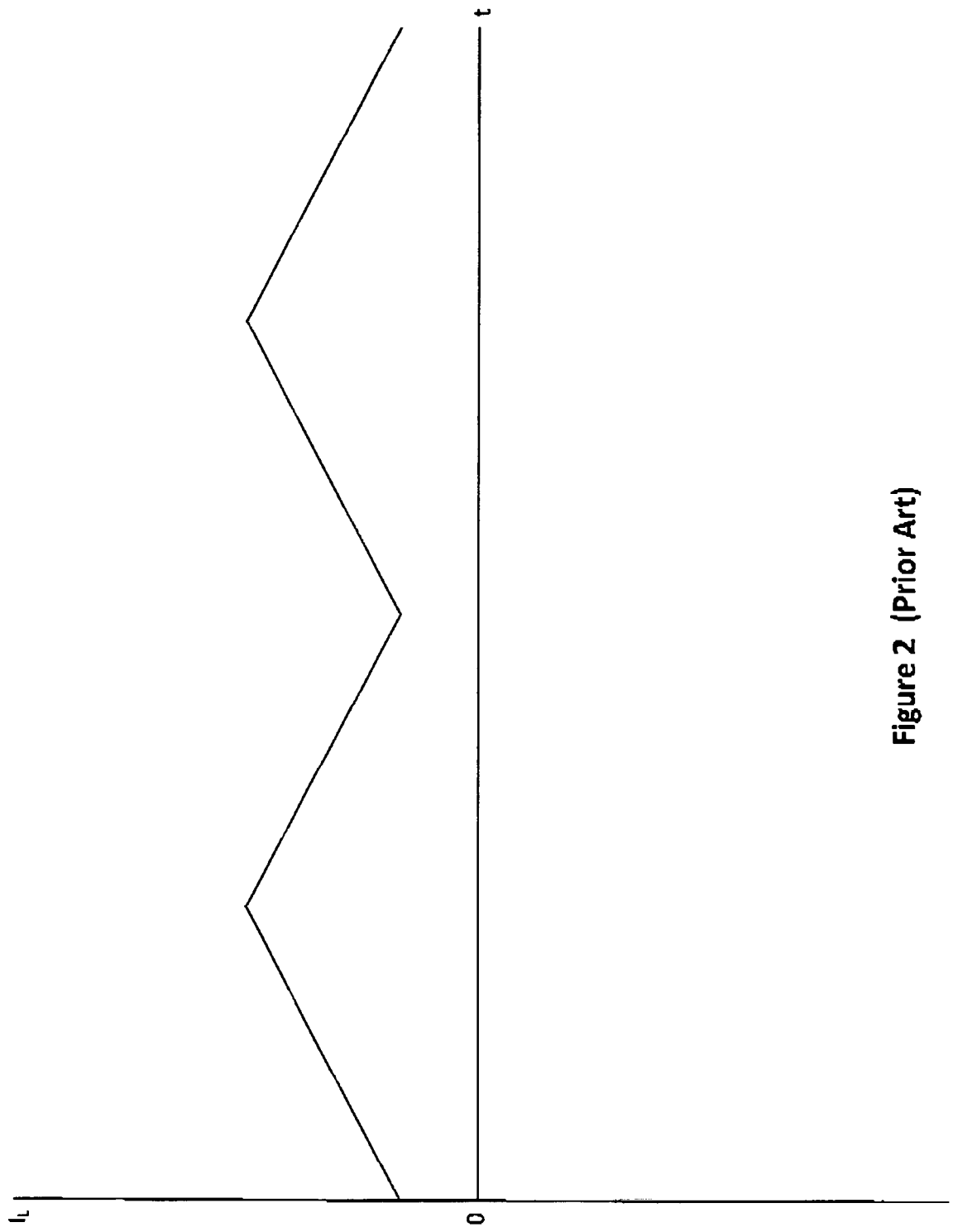
FIG. 2 illustrates an inductor current wave form according to the prior art.
Figure 3:
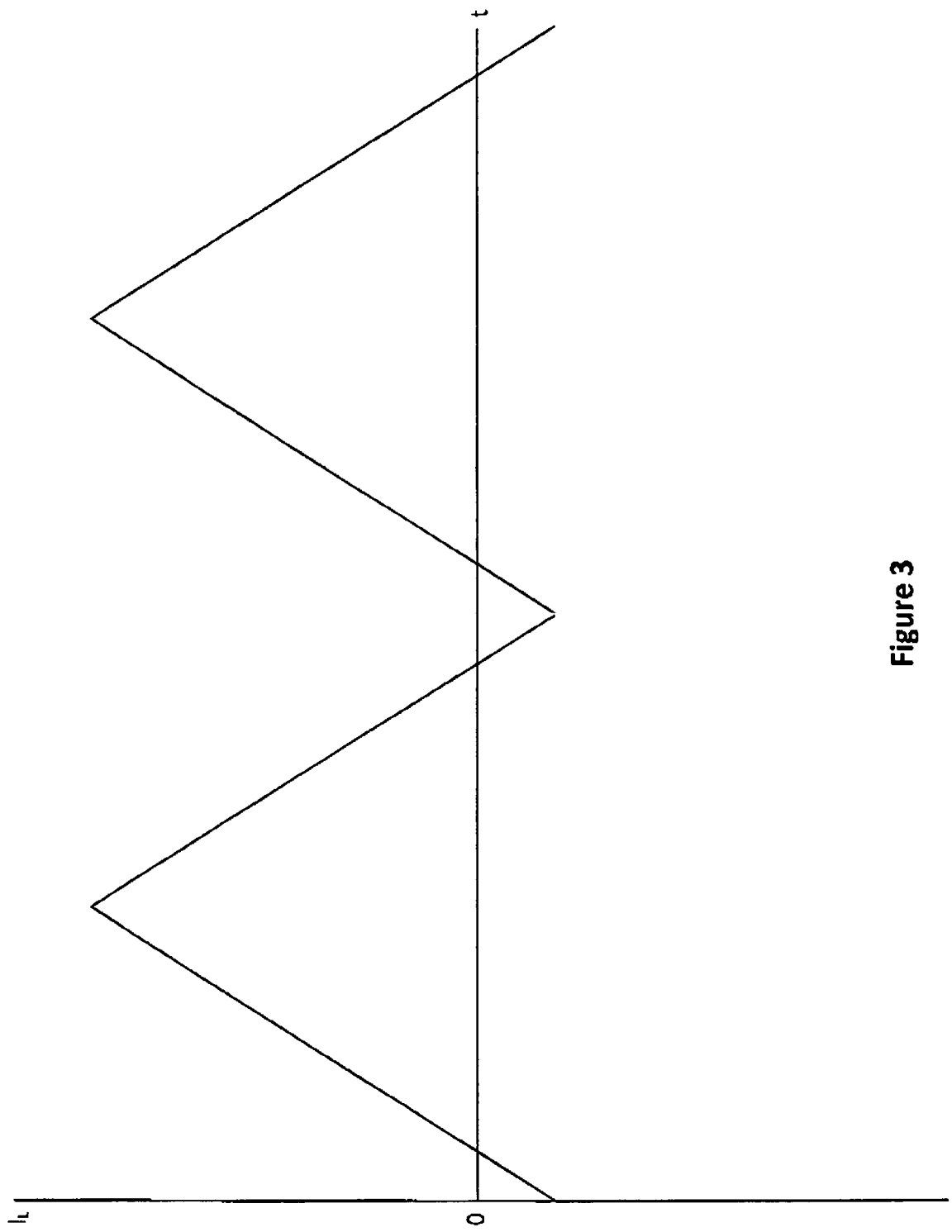
FIG. 3 illustrates an inductor current wave form according to the subject invention.
Figure 8:
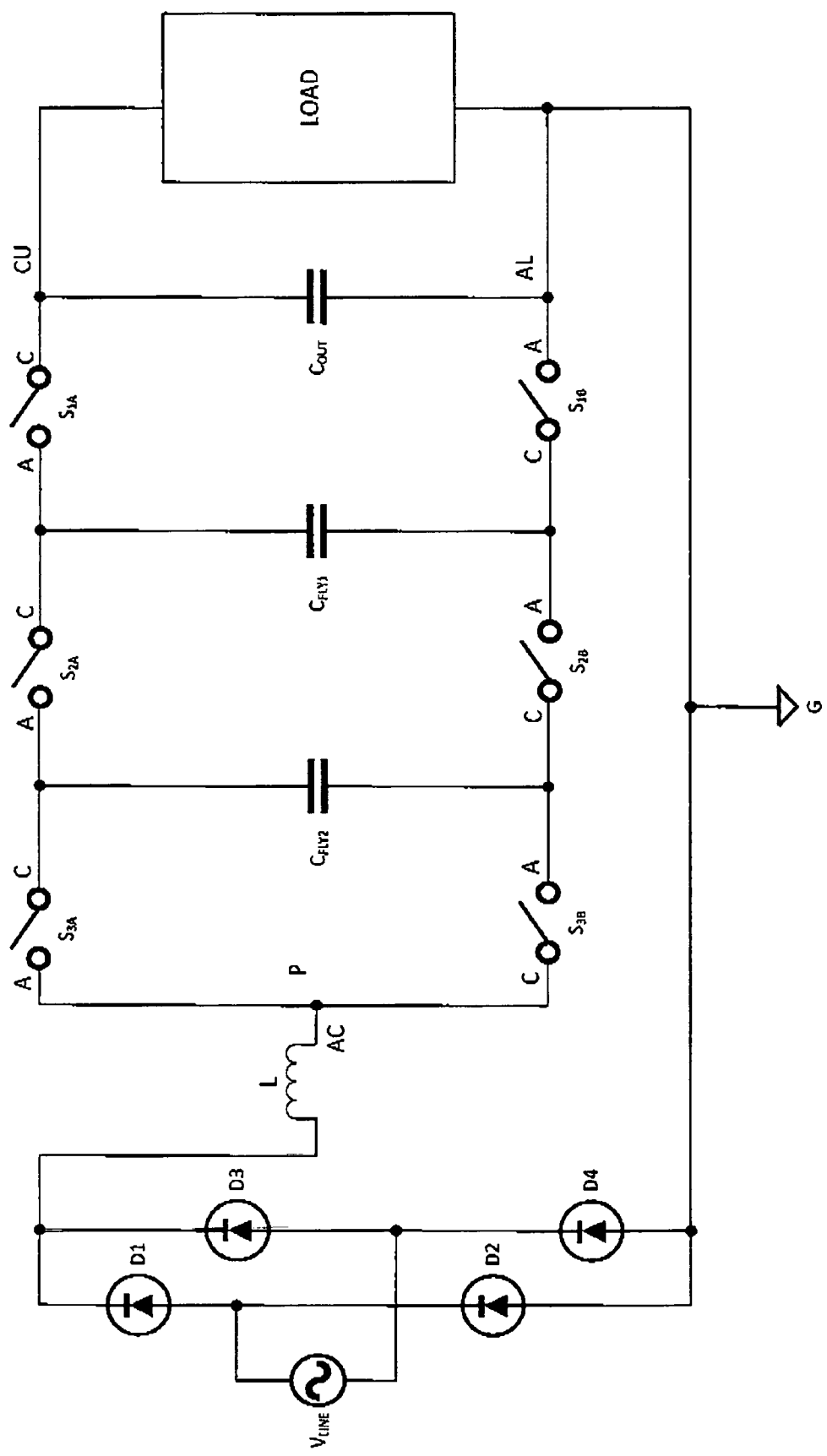
FIG. 8 illustrates a PFC converter using a flying capacitor converter according to the subject invention.

A preferred embodiment of the subject invention is illustrated in FIG. 8. The FIG. 8 circuit is a boost converter for accomplishing power factor correction. The difference between the FIG. 8 circuit and the prior art lies in the fact that the inductor current reverses during each switching cycle, as illustrated in FIG. 3. The reversal of the inductor current means that there is stored magnetic energy in the inductor available for driving a zero voltage turn on transitions for all switches for all transitions. In an initial state, switches $S_{1B}$, $S_{2B}$, and $S_{3A}$ are on and switches $S_{1A}$, $S_{2A}$, and $S_{3B}$ are off and current in the inductor, L, is ramping up and flowing through inductor L from left to right. The current path is through the on switches and flying capacitor $C_{FLY2}$, which is charging. In a first switching transition $S_{2B}$ is turned off. The stored magnetic energy in L tries to maintain the current in L so the voltage at node P rises, and the voltages at the C terminals of $S_{3A}$ and $S_{2B}$ and the A terminal of $S_{2A}$ also rise. The voltage at the A terminal of $S_{2B}$ remains fixed at ground since the switch $S_{1B}$ is closed. The voltage at the A terminal of $S_{2A}$ rises until the voltage applied to the $S_{2A}$ switch is zero at which time $S_{2A}$ is turned on at zero voltage. During the transition the voltage applied to inductor L reverses. During the time $S_{2A}$ is on the inductor current ramps down and capacitor $C_{FLY1}$ charges. The on/off states of the switches remain unchanged until, the current in the inductor reverses and the magnitude of the current increases to a level at which there is sufficient stored magnetic energy to drive a switching transition to zero volts. At the instant that there is sufficient energy to drive a zero voltage switch transition, indicated by the minimum current point in FIG. 3 the $S_{1A}$ switch is turned off. At the instant that $S_{1A}$ is switched off the current in inductor L is flowing from right to left so the magnetic stored energy in L, trying to maintain its inductor current, forces the voltage at node P to drop increasing the $S_{3A}$ voltage and decreasing the voltage applied to $S_{3B}$. $S_{3B}$ is turned on when the $S_{3B}$ switch voltage reaches zero volts. In the subsequent switch state the inductor current ramps up, $C_{FLY2}$ is discharged, and $C_{FLY1}$ is charged. The switches are activated and deactivated in a sequence that enables charge balance in the flying capacitors so that the voltage of $C_{FLY1}$ is maintained at or near ⅔ $V_{LOAD}$ and the voltage of $C_{FLY2}$ is maintained at or near ⅓ $V_{LOAD}$. By reversing the direction of current following each switching transition to a sufficient magnitude to drive a zero voltage turn on transition there will be magnetic stored energy available to drive each switch turn on transition to zero volts thereby eliminating switch turn on transition losses, improving efficiency, and enabling higher operating frequencies.

Figure 6:
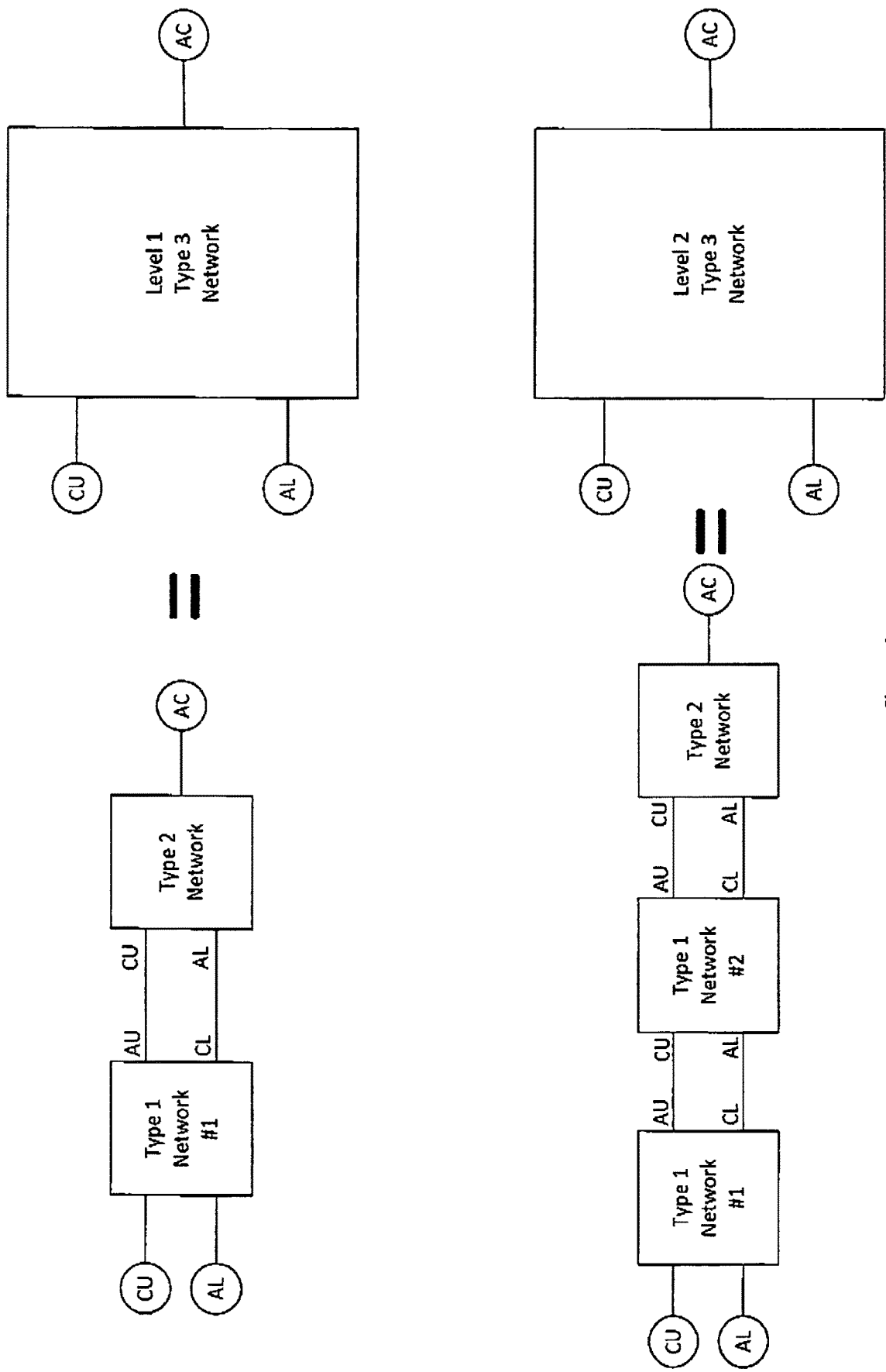
FIG. 6 illustrates type 3 networks used in the formation of flying capacitor converters according to the subject invention.
Figure 7:
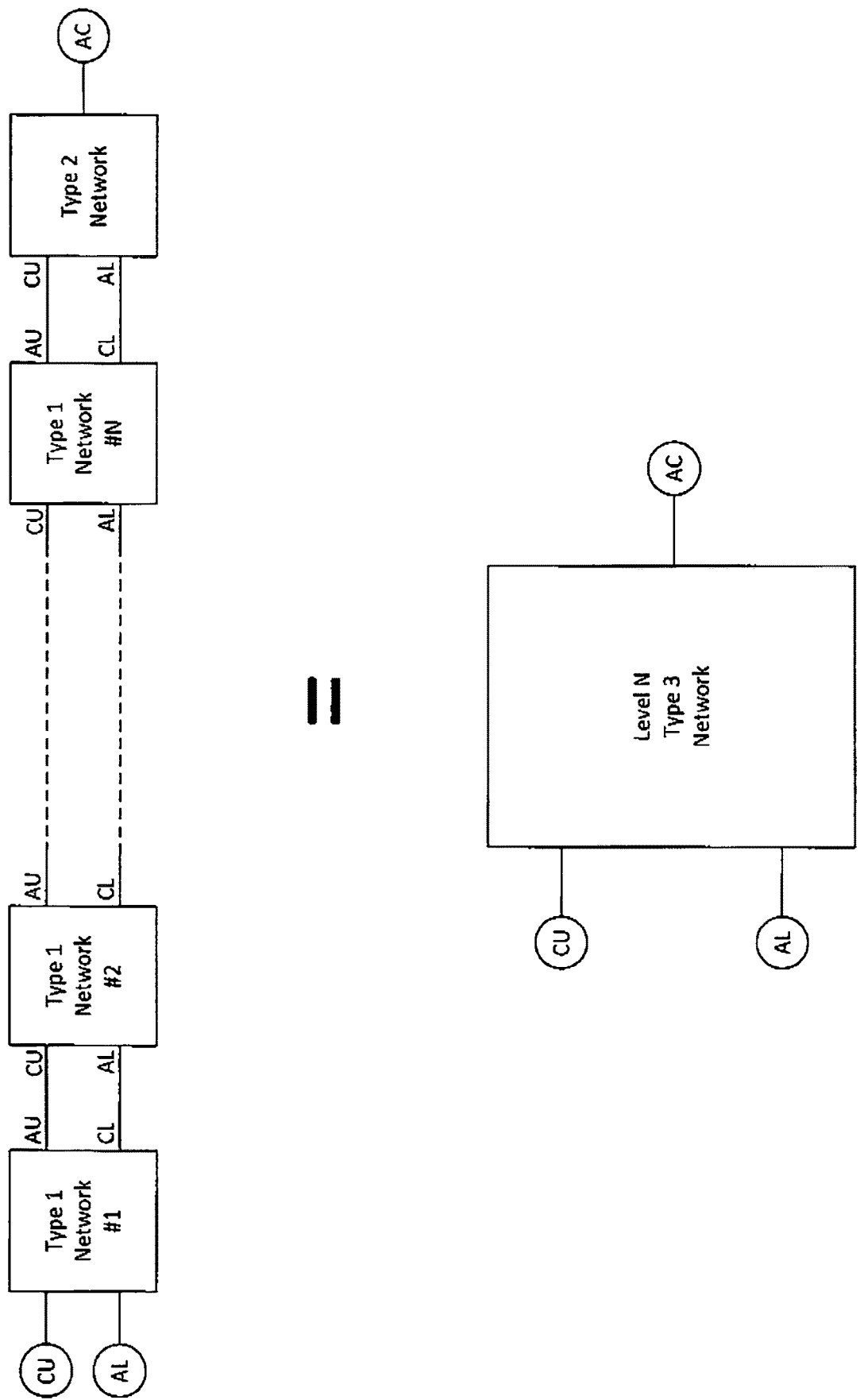
FIG. 7 illustrates level N type 3 networks used in the formation of flying capacitor converters according to the subject invention.

The structure of the FIG. 8 embodiment and other similar embodiments can be described and generalized by breaking down the structure into circuit blocks or networks. FIG. 4 illustrates a type 1 network comprising two main switches and a flying capacitor. In the FIG. 8 embodiment there are two such networks. One type 1 network comprises $S_{1A}$, $C_{FLY1}$, and $S_{1B}$. The second type 1 network comprises $S_{2A}$, $C_{FLY2}$, and $S_{2B}$. In a type 1 network in operation, except during the very brief switching transitions when both switches are off, exactly one switch is on. There can never be a condition in which both switches are on simultaneously. FIG. 5 illustrates a type 2 network that comprises two switches. In the FIG. 8 embodiment $S_{3A}$ and $S_{3B}$ form a type 2 network. In each flying capacitor converter there is a single type 2 network. The rules that apply to the switches in a type 1 network also apply to the type 2 network. Except for the very brief switching transitions in which both switches are off, one or the other of the two switches in the type 2 network is on. There is never a condition in which both switches in a type 2 network are on simultaneously. The combination of a type 1 network or type 1 networks connected in series with each other and a single type 2 network forms a type 3 network, as illustrated in FIGS. 6 and 7. The level of the type 3 network is the number of serially connected type 1 networks in the type 3 network. The FIG. 8 embodiment contains a level 2 type 3 network because there are 2 type 1 networks in the FIG. 8 embodiment.

Figure 9:
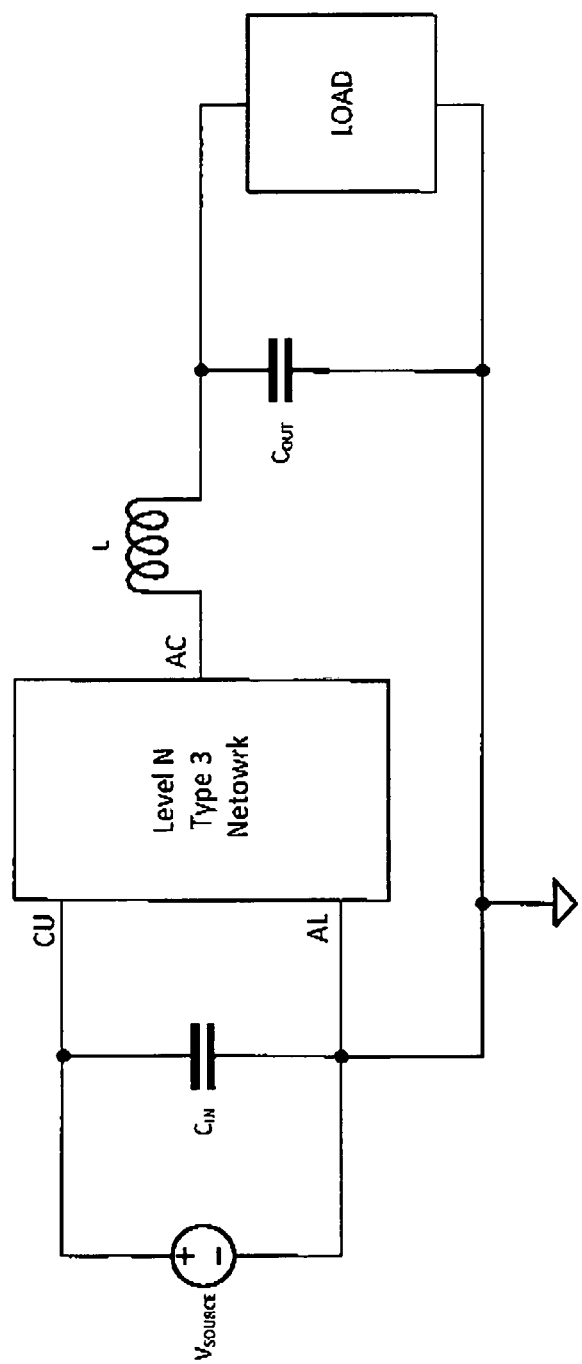
FIG. 9 illustrates a level N type 3 network used in the formation of a buck converter according to the subject invention.

FIG. 9 illustrates another embodiment of the subject invention, which is a buck embodiment. The load voltage depends on the number of on A switches in the type 3 network and the duty cycle, D. $S_{1A}$, $S_{2A}$, $S_{3A}$ are A switches. The A switches are the upper switches and the B switches are the lower switches, as illustrated in FIGS. 1, 4, 5, and 8. For example, if the source voltage is 100 volts and N is 9 then the voltage difference switch configuration states at the AC terminal of the type 3 network will be 10 volts or 1/(N+1) $V_{SOURCE}$. If the AC terminal voltage of the type 3 network is being switched between a switch configuration state in which 5 A switches are on to the switch configuration state in which 4 A switches are on then the load voltage will be between 40 volts and 50 volts. The AC terminal voltage will be 50 volts when there are 5 A switches on and 40 volts when there are 4 A switches on. The exact load voltage will depend on the duty cycle D where D represents the fraction of the time that the switch configuration state has 5 A switches on. In this example if D is 0.5 then the load voltage would be 45 volts. The load voltage will be 40 volts if the duty cycle is 0 and the load voltage will be 50 volts if the duty cycle is 1. In this example the maximum inductor winding voltage stress is 10 volts. If J is the number of on A switches in the lower of the two adjacent switch configuration states and the difference between the two switch configuration states is $V_{SOURCE}/(N+1)=10$ volts, then the load voltage will be $V_{LOAD}=(J+D)/(N+1)\ V_{SOURCE}$. In order to accommodate a load range equal to the full source voltage range wherein the switch configuration states are adjacent to each other, i.e., separated by 10 volts, the duty cycle will at times be 0 or 1. Operating at the duty cycle extremes of 0 and 1 can be a problem in some cases for control and feedback loop stability. If instead the two states are separated by 2 voltage levels then the duty cycle range can be limited to approximately 0.25 to 0.75, but the inductor voltage stress is doubled.

Figure 10:
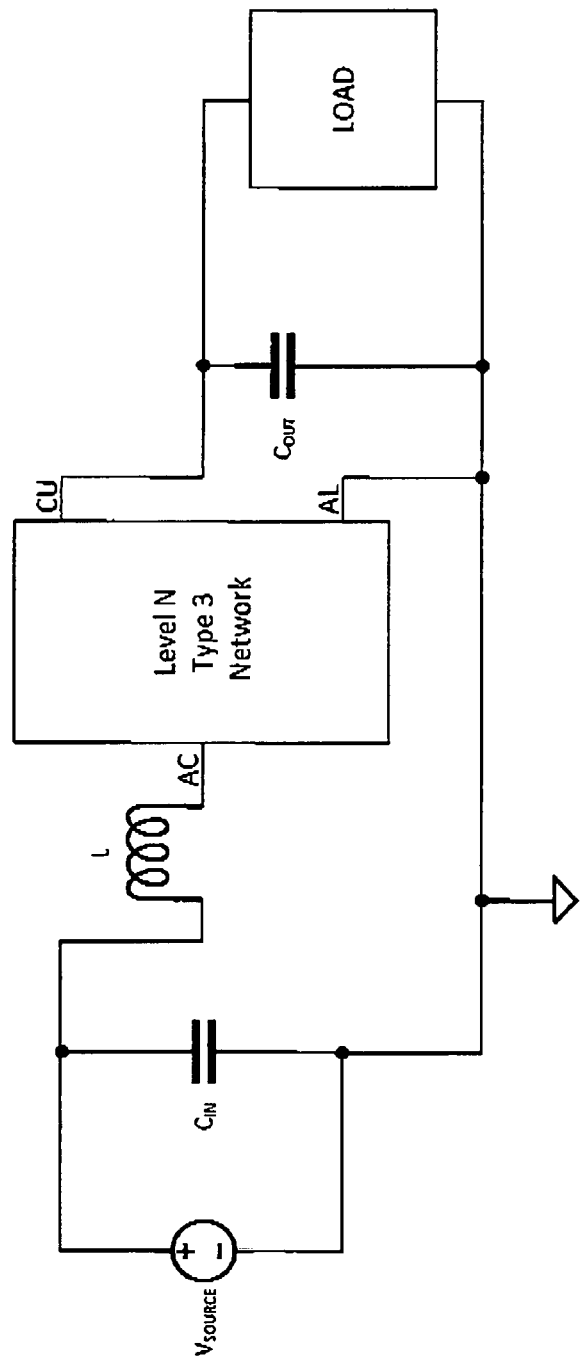
FIG. 10 illustrates a level N type 3 network used in the formation of a boost converter according to the subject invention.

FIG. 10 illustrates a boost converter embodiment of the subject invention wherein the source and load are reversed by comparison to the FIG. 9 embodiment. The boost converter reverses the line and load connections from the buck converter. The load voltage for the boost implementation is $V_{LOAD}=(N+1)/(J+D)\ V_{SOURCE}$.

Figure 11:
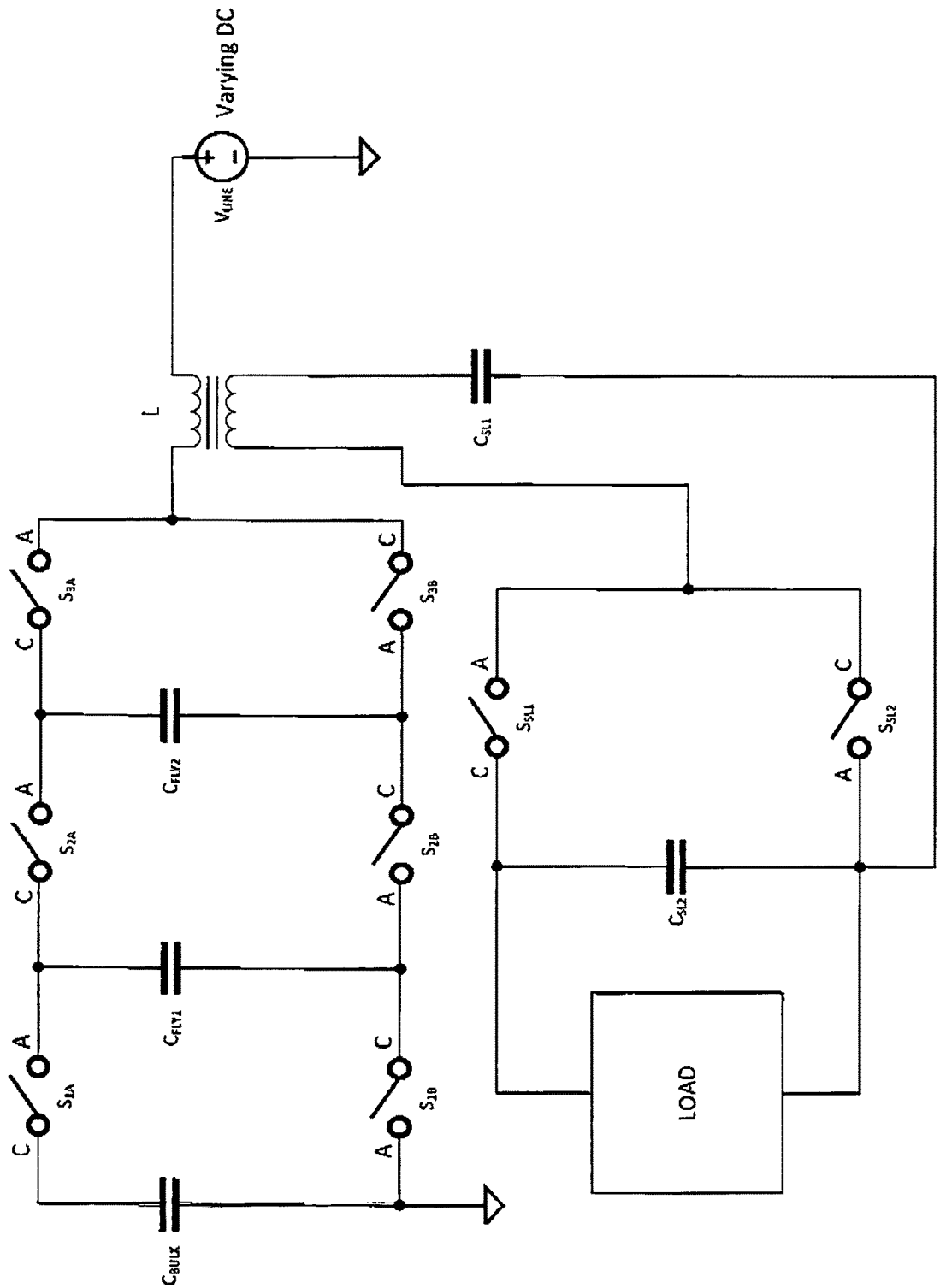
FIG. 11 illustrates a level 2 type 3 network used in the formation of an isolated fixed frequency boost converter according to the subject invention.

FIG. 11 illustrates another embodiment of the subject invention wherein the inductor is replaced by a coupled inductor and the line and load are galvanically isolated. In the FIG. 11 implementation the pair of terminals of the level 2 type 3 network at the end of the network opposite to the coupled inductor is neither a dc source nor a dc load. No dc power is transferred through the type 3 network. The bulk capacitor $C_{BULK}$ and the type 3 network serve as a reset circuit for the coupled inductor. In the FIG. 11 circuit the primary winding of the coupled inductor is connected to a varying dc source, such as a rectified mains line voltage source and power is delivered to the substantially dc load connected in a secondary circuit of the coupled inductor. In the FIG. 11 circuit the line current can be controlled and tightly regulated by controlling the duty cycle and switch configuration states of the switches in the type 3 network. $S_{SL1}$ and $S_{SL2}$ are synchronous rectifiers operating in synchronization with the switches in the type 3 network. One advantage of the FIG. 11 circuit is that the circuit can achieve zero voltage switching with a fixed switching frequency. Energy for driving zero voltage switch transitions is derived from the magnetizing energy in the magnetizing inductance of the coupled inductor, L, and from the leakage inductance stored energy. Because the type 3 network has a capacitive load the net charge into the bulk capacitor is zero during each line voltage cycle but there is also reversal of current during each switching cycle as a natural occurrence without adjusting the switching period. One caveat here is that the coupled inductor cannot work effectively to transfer power to the secondary at duty cycle extremes. The circuit is most efficient when the duty cycle is close to 0.5. For the FIG. 11 converter operation, the difference voltage between switch configuration states should be $2/(N+1)\ V_{CBULK}$, which corresponds to a duty cycle range of 0.25 to 0.75, where $V_{CBULK}$ is the voltage applied to $C_{BULK}$. To achieve a higher level of inductor size reduction with the FIG. 11 circuit a higher level type 3 network should be used, as illustrated in FIG. 12, where N would be significantly larger than 2, perhaps, 7, which would yield a 4 times improvement in inductor voltage stress and size plus duty cycle limited to the 0.25 to 0.75 range.

Figure 12:
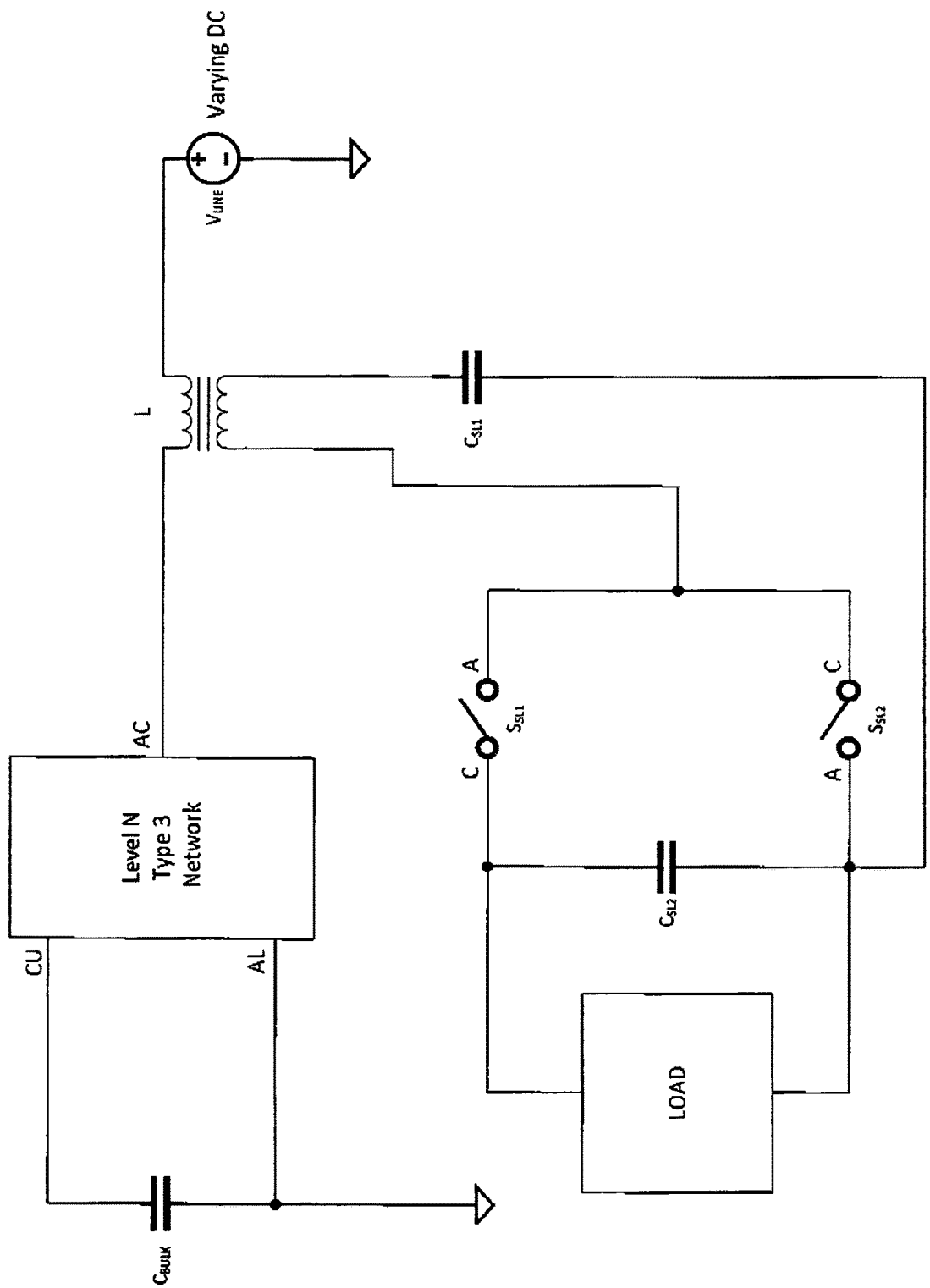
FIG. 12 illustrates a level N type 3 network used in the formation of an isolated boost converter according to the subject invention.
Figure 13:
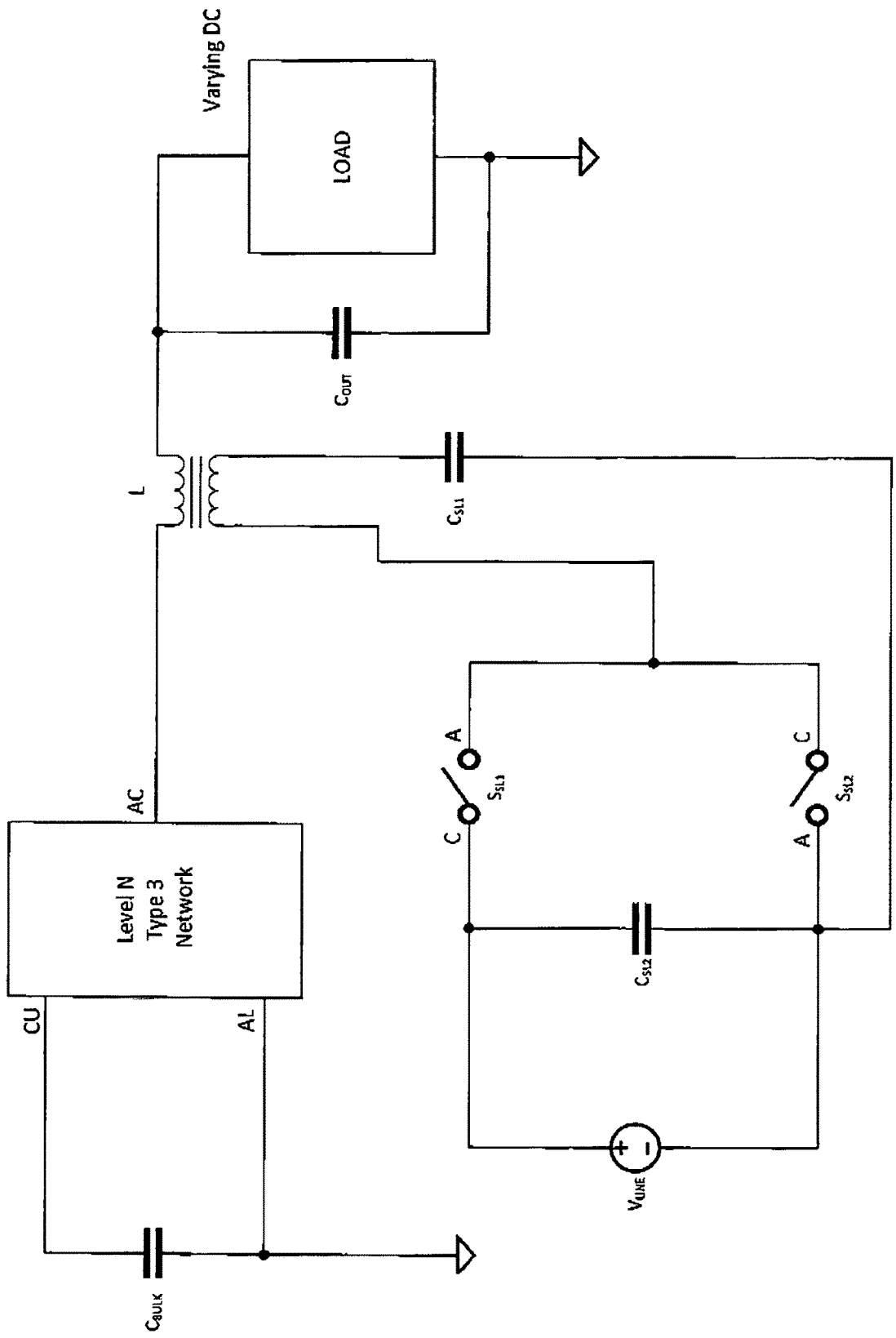
FIG. 13 illustrates a level N type 3 network used in the formation of an isolated buck converter according to the subject invention.

Another embodiment of the subject invention is illustrated in FIG. 13. In the embodiment illustrated in FIG. 13 the line and load of the FIG. 12 circuit are reversed so that a substantially dc source of voltage is applied in a primary circuit comprising two switches and 2 capacitors and the level N type 3 network, where N is a positive integer, is applied to the secondary circuit.

Figure 14:
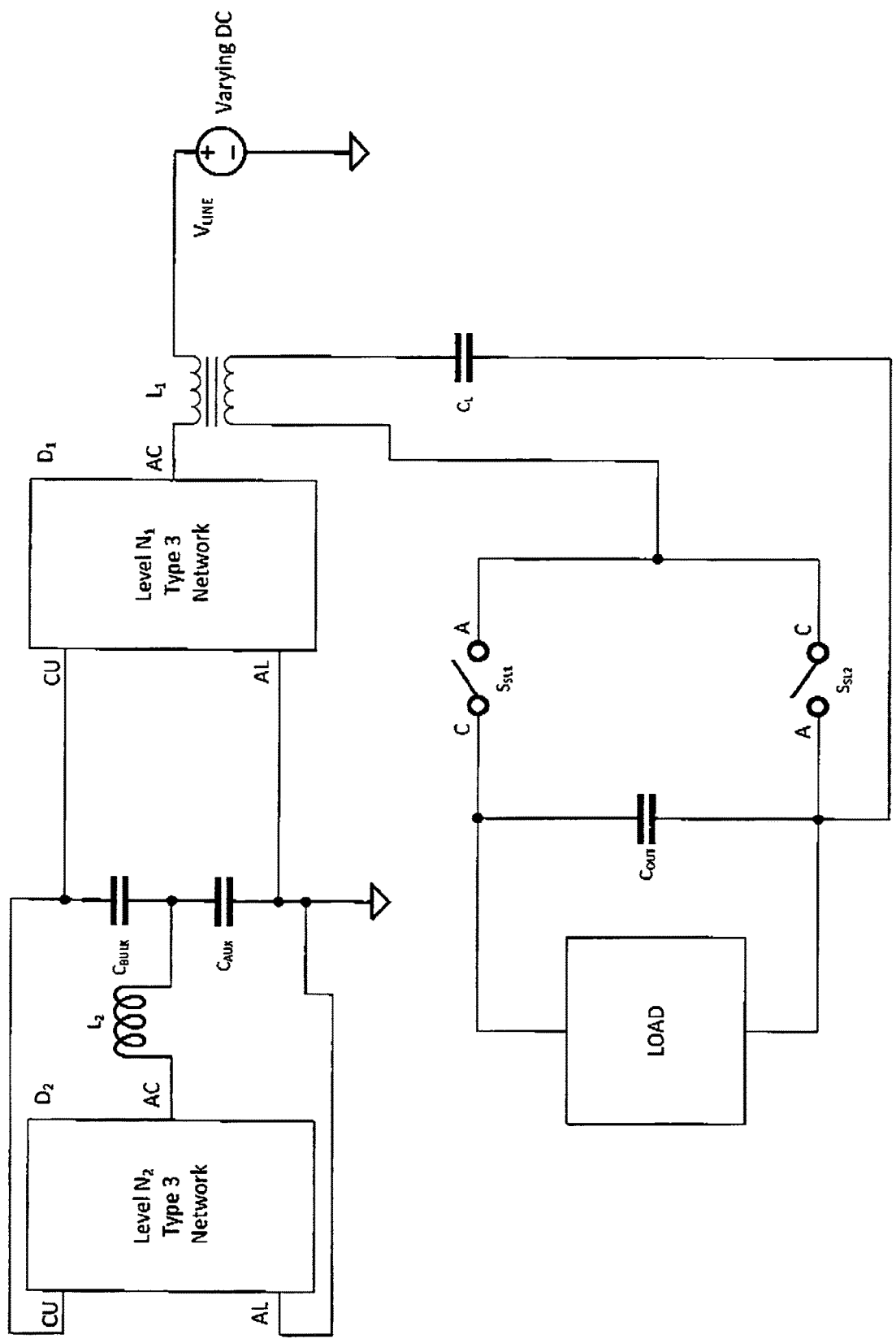
FIG. 14 illustrates a single stage PFC converter with regulated output voltage using 2 type 3 networks according to the subject invention.

FIG. 14 illustrates another embodiment of the subject invention similar to the FIG. 12 embodiment but with an ac voltage source. In the FIG. 14 embodiment two type 3 networks are used with different duty cycles. A first type 3 network having a duty cycle of $D_1$ is used to control the line current, as would be desired for power factor correction. A second much lower power flying capacitor converter exchanges energy with the bulk capacitor and controls the voltage of the first type 3 network by controlling the voltage of an auxiliary capacitor connected in series with the bulk capacitor. By regulating the voltage of the first type 3 network the load voltage is regulated, the result of which is a power factor correction converter with a regulated and isolated load using two relatively small magnetic elements by comparison to the standard approach for regulated and isolated power factor corrected power conversion. By reversing the line and load in the FIG. 14 embodiment an inverter or amplifier circuit, which can independently control two operational parameters, such as load voltage and load current, results.

Figure 15:
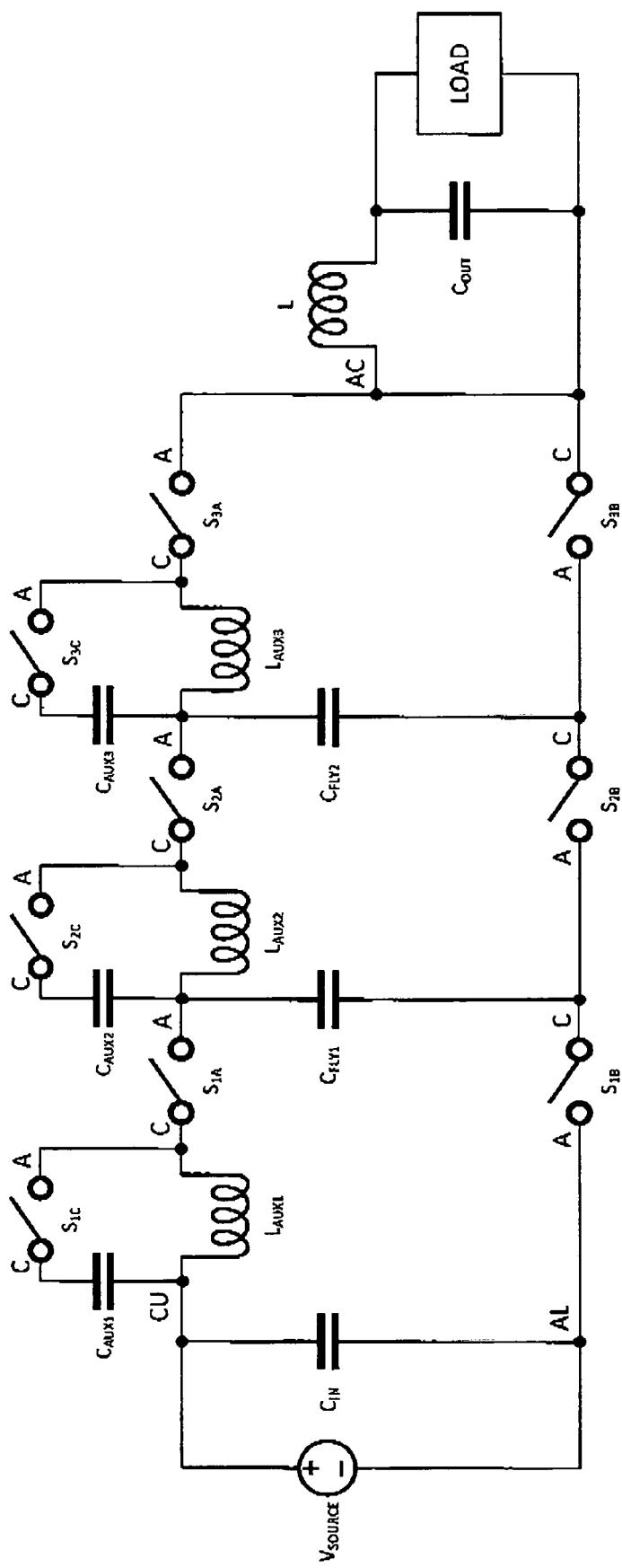
FIG. 15 illustrates a level 2 type 5 network used in the formation of a fixed frequency non-isolated buck converter according to the subject invention.
Figure 17:
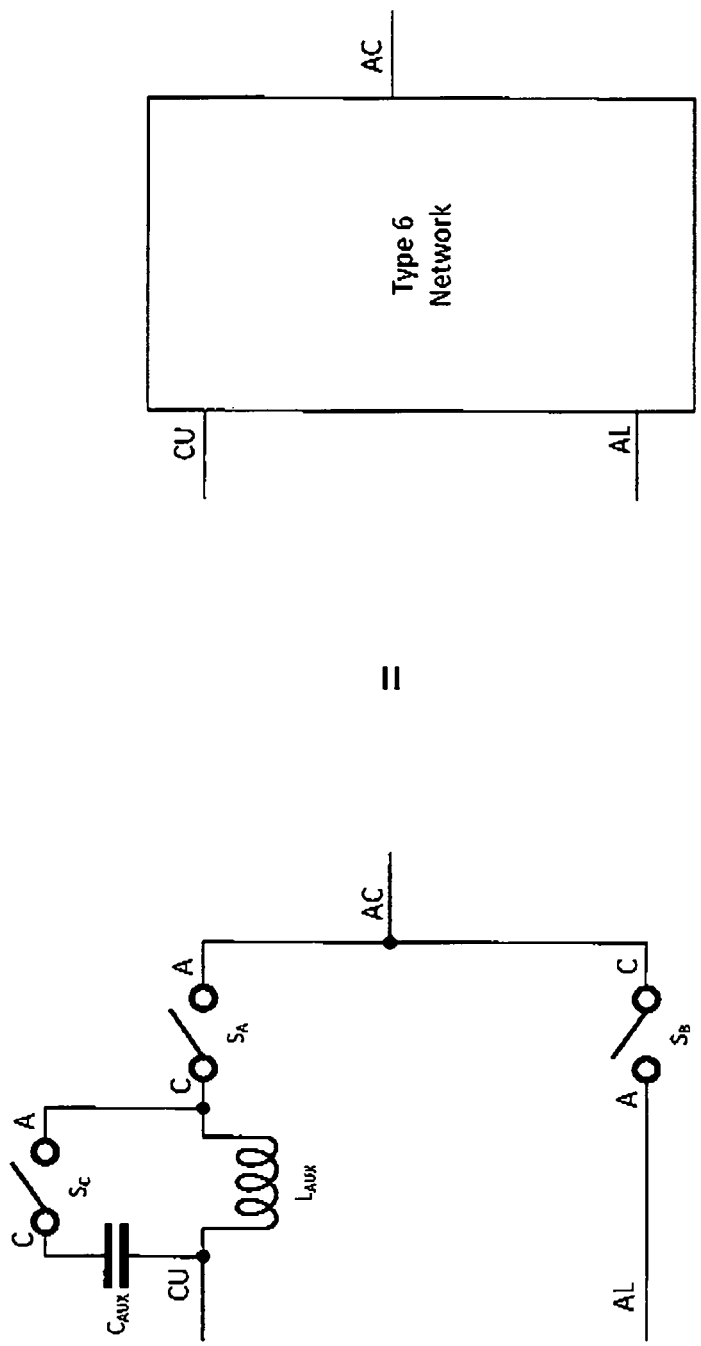
FIG. 17 illustrates type 6 networks according to the subject invention.
Figure 18:
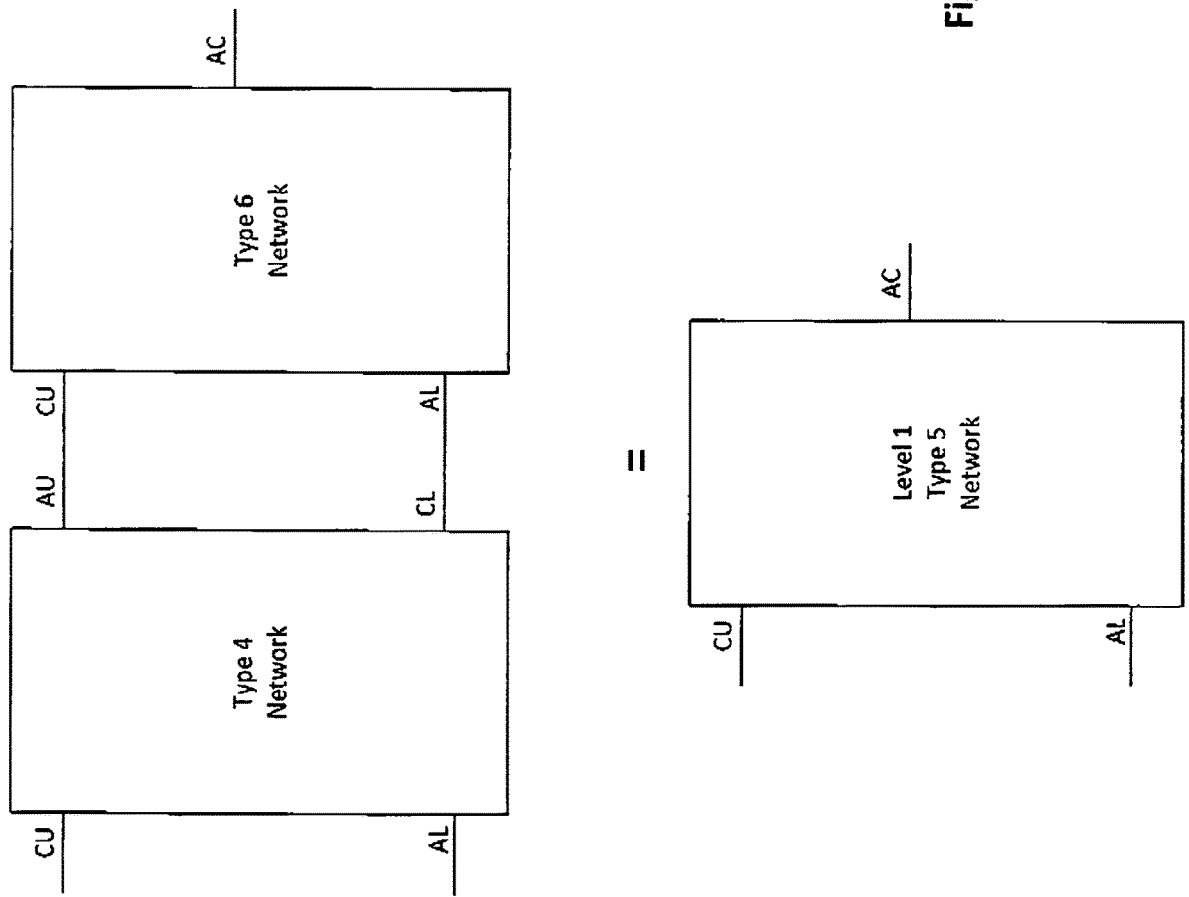
FIG. 18 illustrates a level 1 type 5 networks according to the subject invention.
Figure 19:
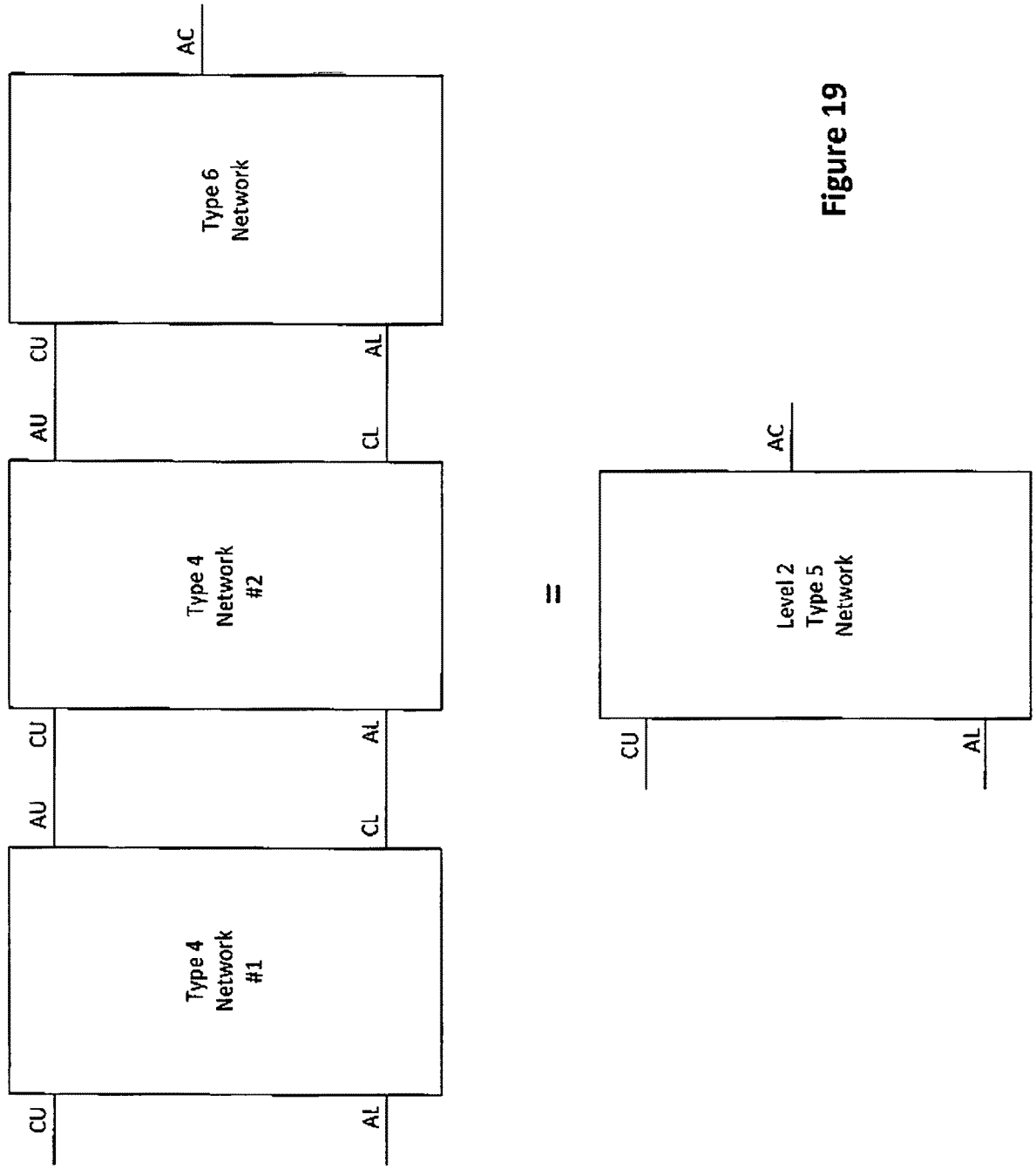
FIG. 19 illustrates level 2 type 5 networks according to the subject invention.
Figure 20:
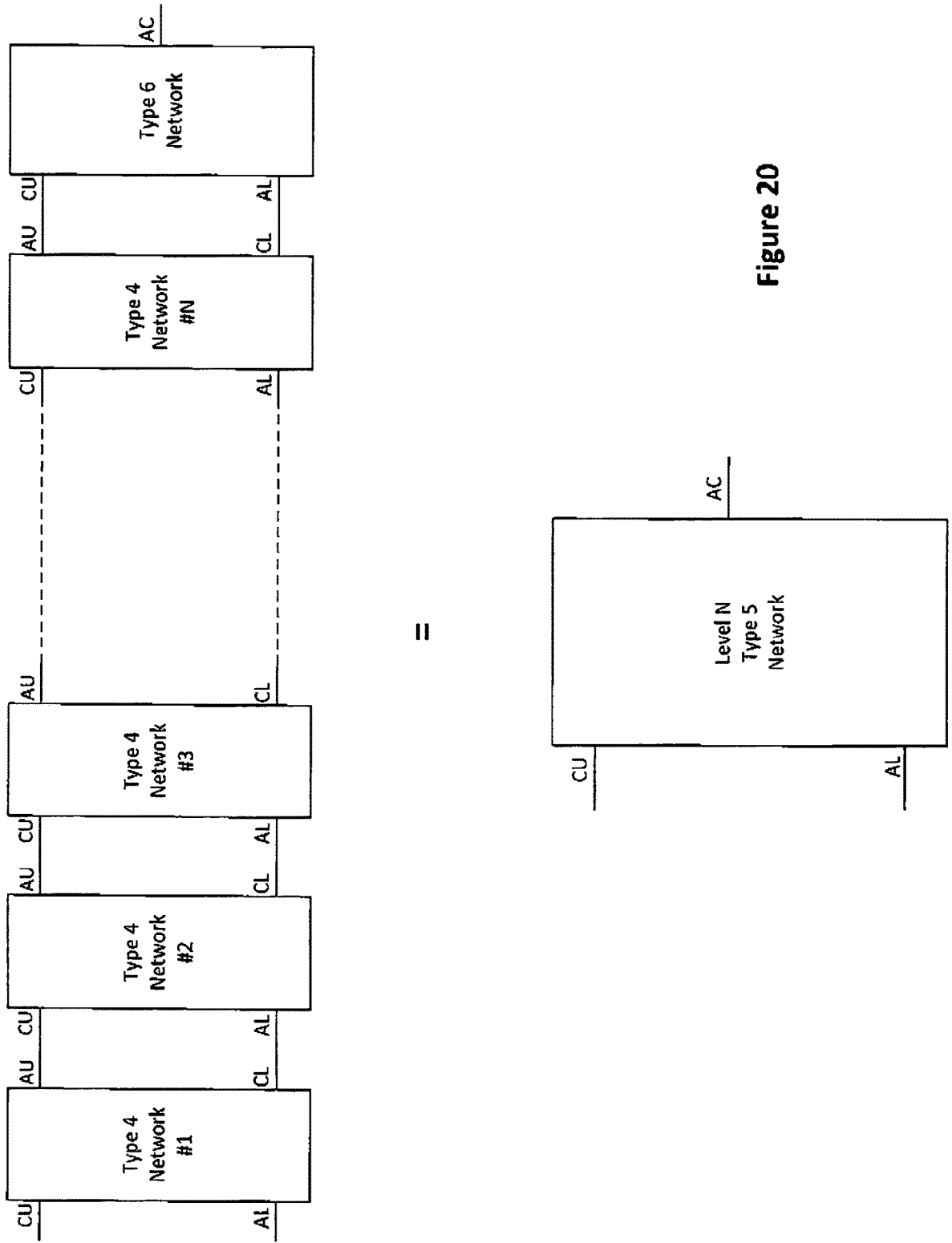
FIG. 20 illustrates level N type 5 networks according to the subject invention.
Figure 21:
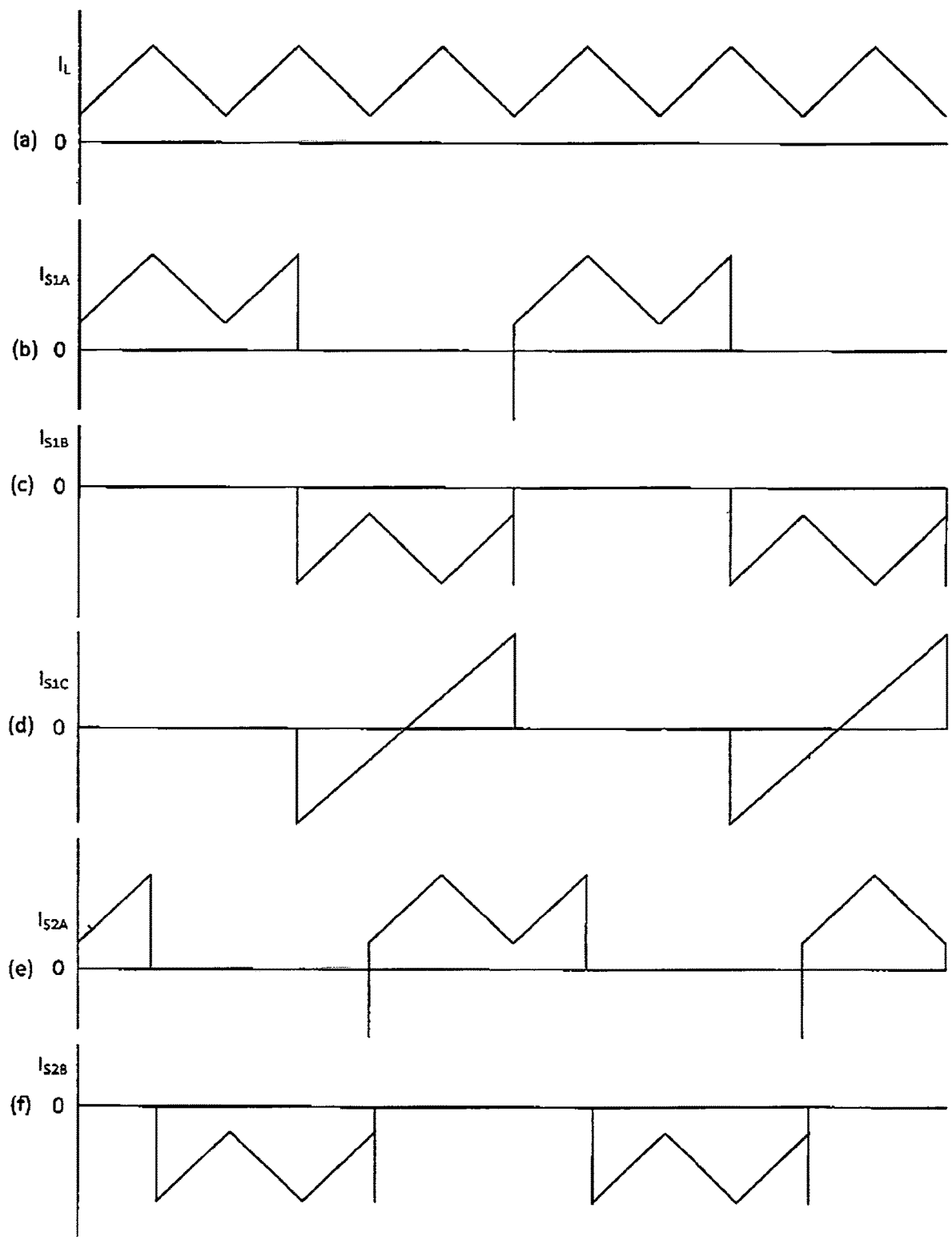
FIG. 21 illustrates current wave forms of the FIG. 15 circuit according to the subject invention.
Figure 21:
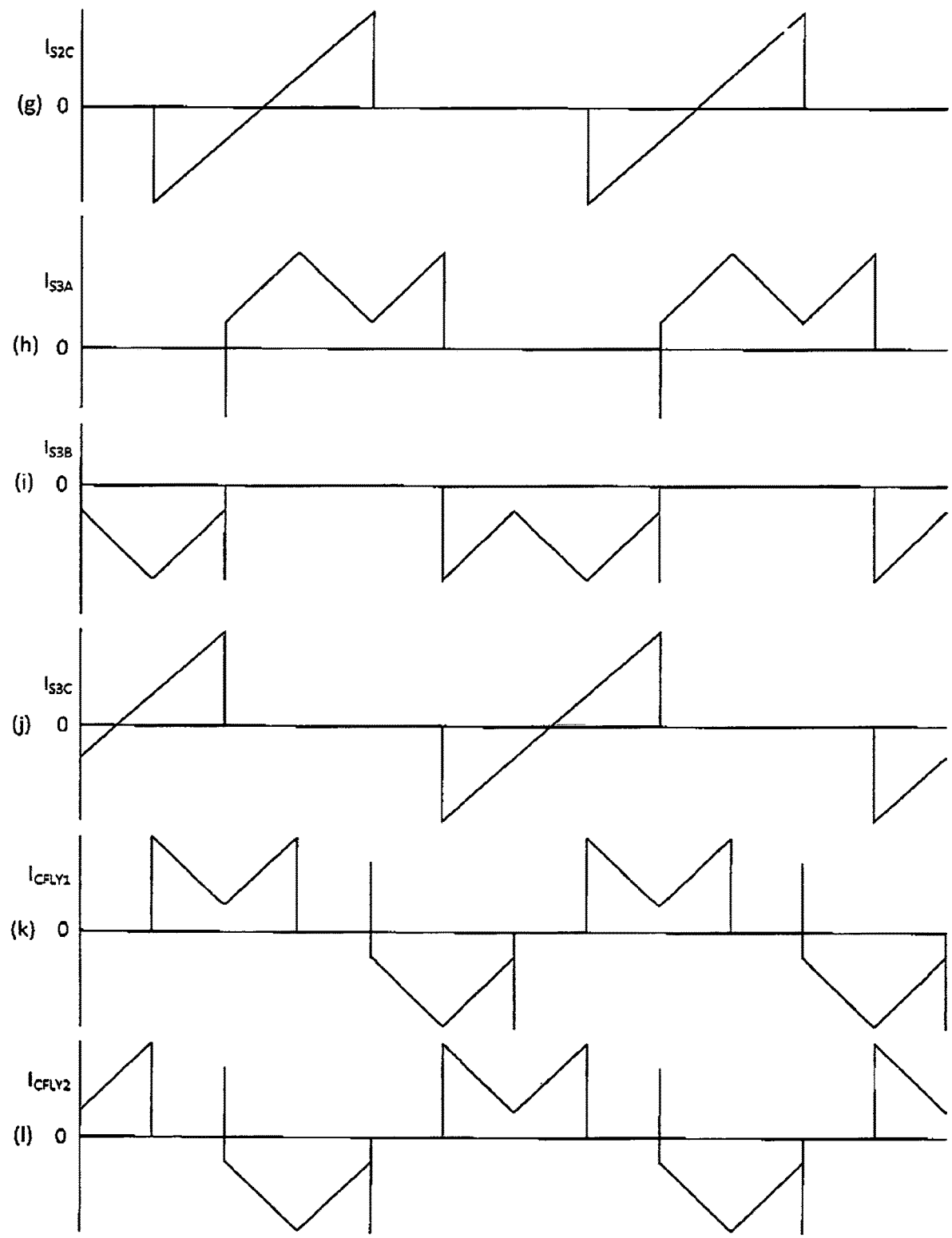

FIG. 15 illustrates another embodiment of the subject invention which achieves zero voltage switching at fixed operating frequency with a single winding main inductor. In the FIG. 15 embodiment an auxiliary switch, an auxiliary capacitor, and an auxiliary inductor are added to each switch section by comparison to the previously discussed embodiments. The FIG. 15 embodiment comprises a level 2 type 5 network, as illustrated in FIG. 19 and FIG. 20, which comprises 2 type 4 networks wherein each type 4 network comprises two main switches, a flying capacitor, an auxiliary switch, an auxiliary capacitor, and an auxiliary inductor, as illustrated in FIG. 16 and a single type 6 network wherein the type 6 network comprises two main switches, an auxiliary switch, an auxiliary capacitor, and an auxiliary inductor, as illustrated in FIG. 17, and a single winding main inductor L. Operation of the FIG. 15 embodiment depends on the direction of power flow. If power flows out of the AC terminal of the type 5 network, which is left to right in FIG. 15, then the auxiliary switch operates substantially in anti-synchronization to the main switch to which it is directly connected in the same shared type 4 network. If power flows into the AC terminal of the type 5 network, which is right to left in FIG. 15, then the auxiliary switch operates substantially in synchronization with the main switch to which it is directly connected in the same shared type 4 network. For the condition in which power flows out of the AC terminal of the type 5 network in a steady state we consider the $S_{2A}$ switch. During the on state of $S_{2A}$, $S_{2C}$ is off. The current in $S_{2A}$ is from left to right towards the AC terminal of the type 5 network. When power flow in the FIG. 15 circuit is from left to right then the $S_{2B}$ switch functions as a synchronous rectifier. When $S_{2A}$ is turned off energy stored in $L_{AUX2}$ forces the A terminal of $S_{2C}$ to rise in voltage until the voltage across $S_{2C}$ is zero at which time $S_{2C}$ is turned on at zero voltage. At the same time that $S_{2A}$ is turned off the voltage across $S_{2B}$ collapses driven by energy in the main inductor L that forces the voltage at the AC terminal of the type 5 network to fall. While $S_{2C}$ is on, the current in $S_{2C}$ and $L_{AUX2}$ ramps down, and reverses. In the steady state the net charge that flows into $C_{AUX}$ during a full cycle must be zero. In this case the voltage at the terminal of $C_{AUX}$ that connects to the C terminal of $S_{2C}$ is positive with respect to the voltage at the $C_{AUX}$ terminal connected to $L_{AUX2}$. $S_{2C}$ is turned off at the instant that the current magnitude in $L_{AUX2}$ is equal and opposite to the current in $L_{AUX2}$ at the time that $S_{2A}$ was turned off. At this instant the current in $L_{AUX2}$ is from right to left and flowing towards $S_{1A}$. When $S_{2C}$ is turned off current in $L_{AUX2}$ is flowing from right to left and the stored energy in $L_{AUX2}$ is a maximum. $S_{2C}$ is turned off at the same instant that $S_{2B}$ is turned off. When $S_{2B}$ is turned off current, equal to the magnitude of current in the L inductor, is flowing in $S_{2B}$ from the A terminal of $S_{2B}$ to the C terminal of $S_{2B}$ and this current transfers into an intrinsic diode that forms a part of $S_{2B}$. At the instant that $S_{2B}$ turns off the magnitude of the current in $S_{2B}$ is less than the magnitude of the current in $L_{AUX2}$. The stored energy in $L_{AUX2}$ forces the voltage at the C terminal of $S_{2A}$ to fall and the voltage at the A terminal of $S_{1A}$ to rise. The $L_{AUX2}$ current flows in a loop that includes $C_{FLY1}$, the forward biased intrinsic diode of $S_{2B}$, $C_{FLY2}$, and $S_{2A}$. The current flow in $S_{2A}$ causes its output capacitance to discharge until the voltage applied to $S_{2A}$ is zero, at which time $S_{2A}$ is turned on at zero voltage. Current wave forms for the switches and capacitors are illustrated in FIG. 21. FIGS. 21(*e*), 21(*f*), and 21(*g*) illustrate the currents in $S_{2A}$, $S_{2B}$, and $S_{2C}$, respectively. FIGS. 21(*k*) and 21(*l*) illustrate currents in flying capacitors, $C_{FLY1}$ and $C_{FLY2}$, respectively. During the brief turn on transition of $S_{2A}$ and very briefly after $S_{2A}$ is turned on at zero voltage the current in $L_{AUX2}$ drops rapidly to the current in main inductor L.

When power flow in the FIG. 15 circuit is from right to left the $S_{2A}$ switch functions as a synchronous rectifier and the $S_{2C}$ switch is operated in synchronization with the $S_{2A}$ switch. The $S_{2C}$ switch always operates in synchronization with the synchronous rectifier in its shared type 4 network.

By comparison to the embodiments discussed previously the FIG. 15 embodiment requires more circuit elements. The addition of an auxiliary inductor in each type 4 and type 6 switch network might suggest that the volume of this embodiment would be much larger. The size of the auxiliary inductor is dictated by the stored energy it must hold. Inductor stored energy is $\frac{1}{2} L_{AUX2} I^2$. The inductor stored energy is used to charge the $S_{2C}$ output capacitance and to discharge the $S_{2A}$ output capacitance. The minimum inductor energy required IS $\frac{1}{2} (C_{S2C}+C_{S2A}) (V_{SOURCE}/3)^2$. Since the capacitor voltage change is much smaller than the source voltage and the energy required depends on the square of that voltage the amount of energy required will be very small and the size of the inductor required will be very small. In order to minimize the volume needed for the auxiliary inductors the main inductor value should be chosen so that the current in L, the main inductor, reverses each cycle for loads less than a load threshold, where the load threshold is greater than approximately half the maximum load. By choosing a load threshold that is larger, the needed size of the auxiliary inductors will be smaller, and the contribution of the auxiliary inductors to the total volume of the system will be minimal. Operation of the converter at fixed frequency provides a big advantage because, with a variable frequency zero voltage switching mechanism, the size of the main inductor L is dictated by the maximum load which corresponds to the minimum operating frequency. The inductor size will be larger for a variable frequency zero voltage switching mechanism, i.e., a zero voltage switching mechanism that requires that the main inductor magnetizing current be reversed each cycle. Operating at fixed frequency also limits the drive circuit power which is a maximum for a variable frequency system at light load where the operating frequency is highest.

Figure 22:
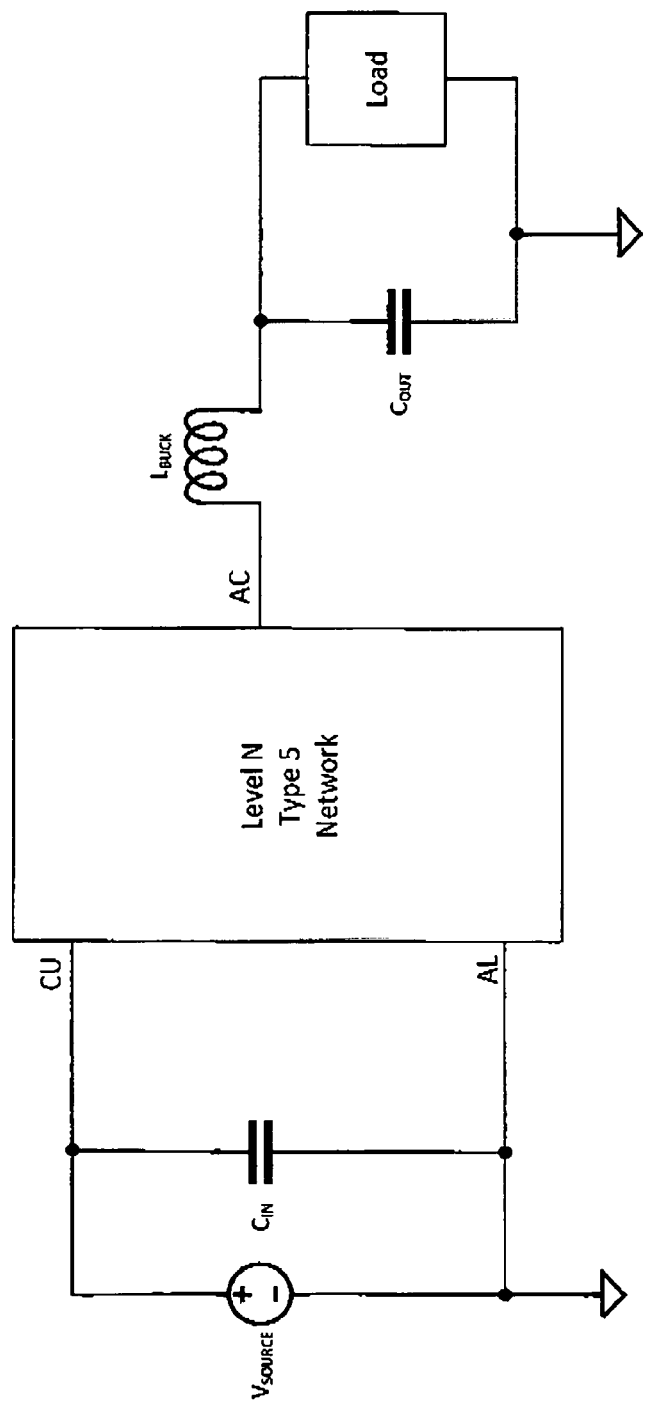
FIG. 22 illustrates a fixed frequency level N type 5 network implementation of a buck converter according to the subject invention.
Figure 23:
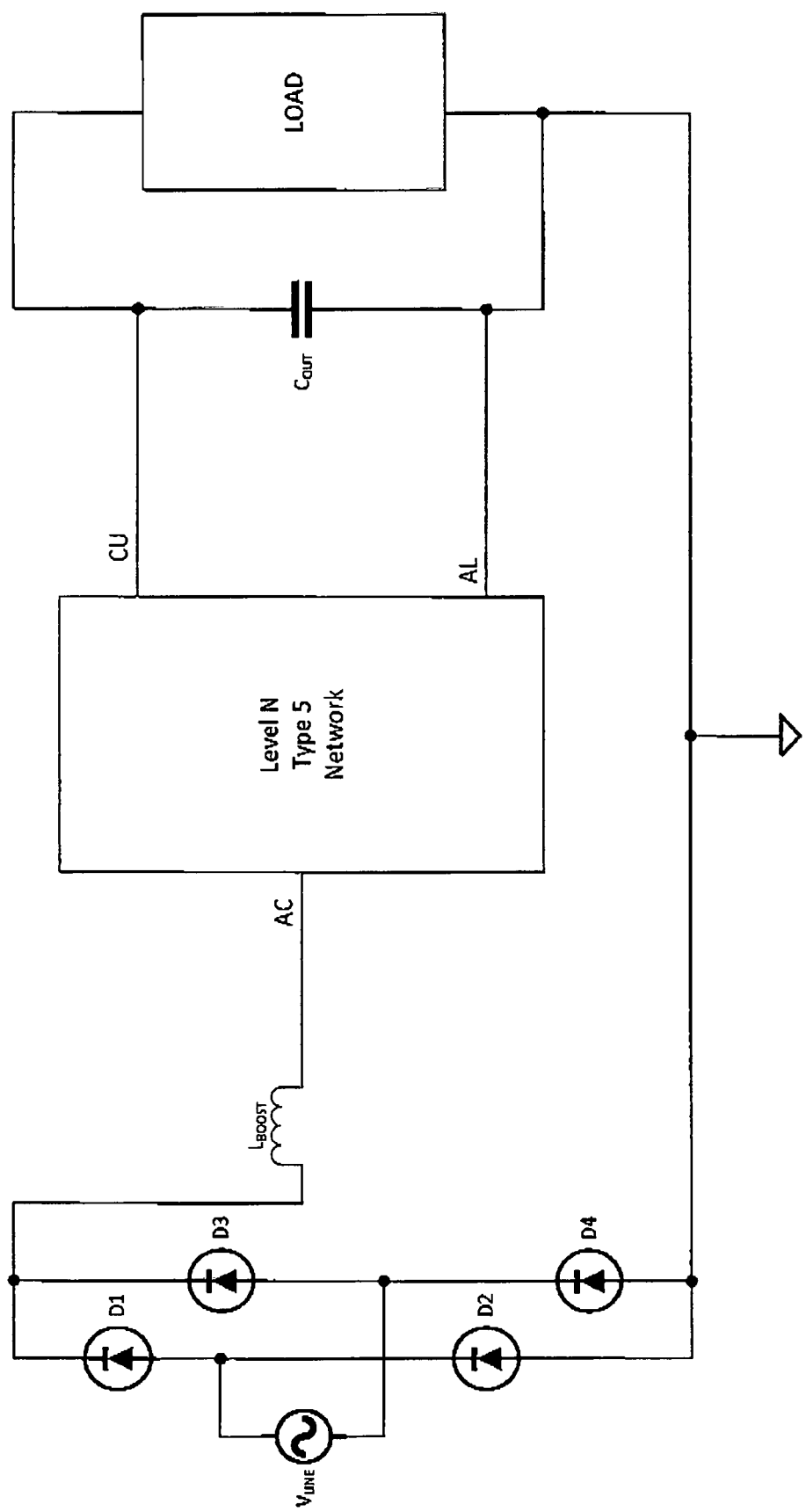
FIG. 23 illustrates a level N type 5 network implementation of a PFC converter according to the subject invention.
Figure 24:
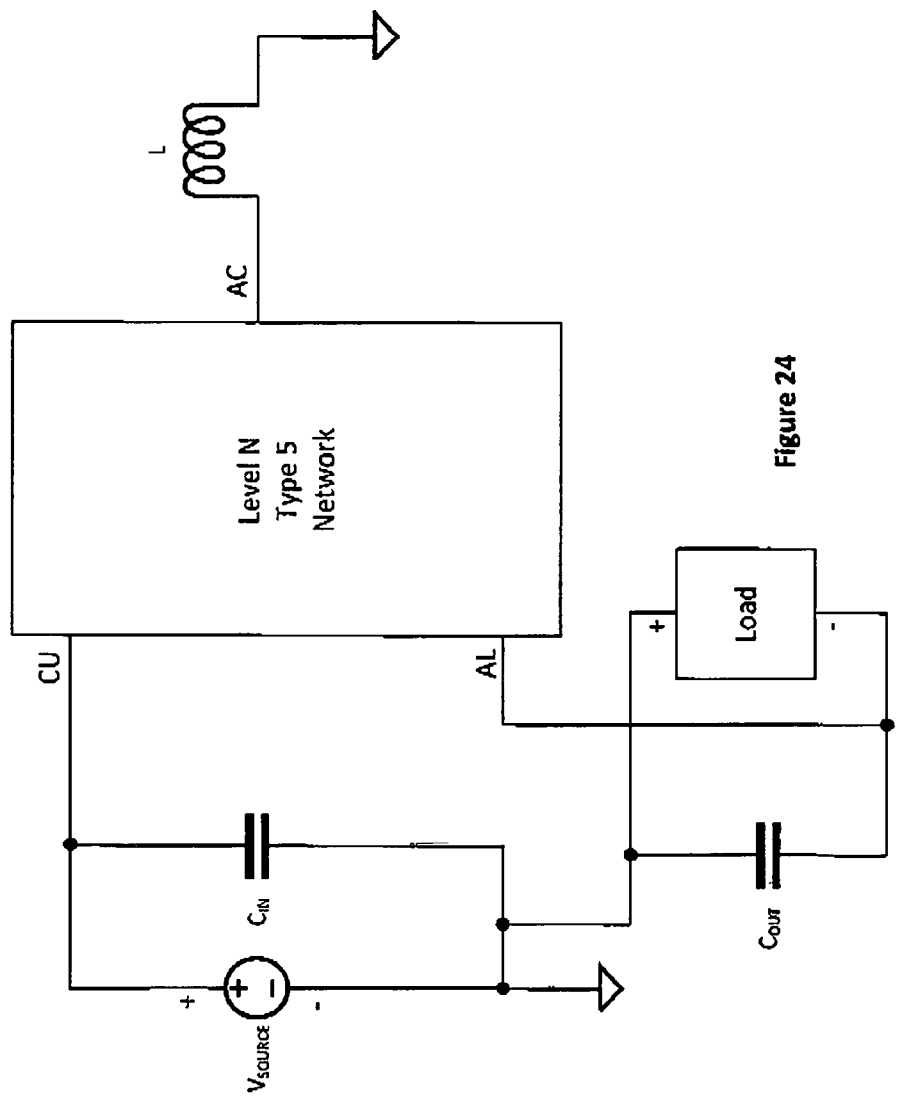
FIG. 24 illustrates a level N type 5 network implementation of a buck boost converter according to the subject invention.
Figure 25:
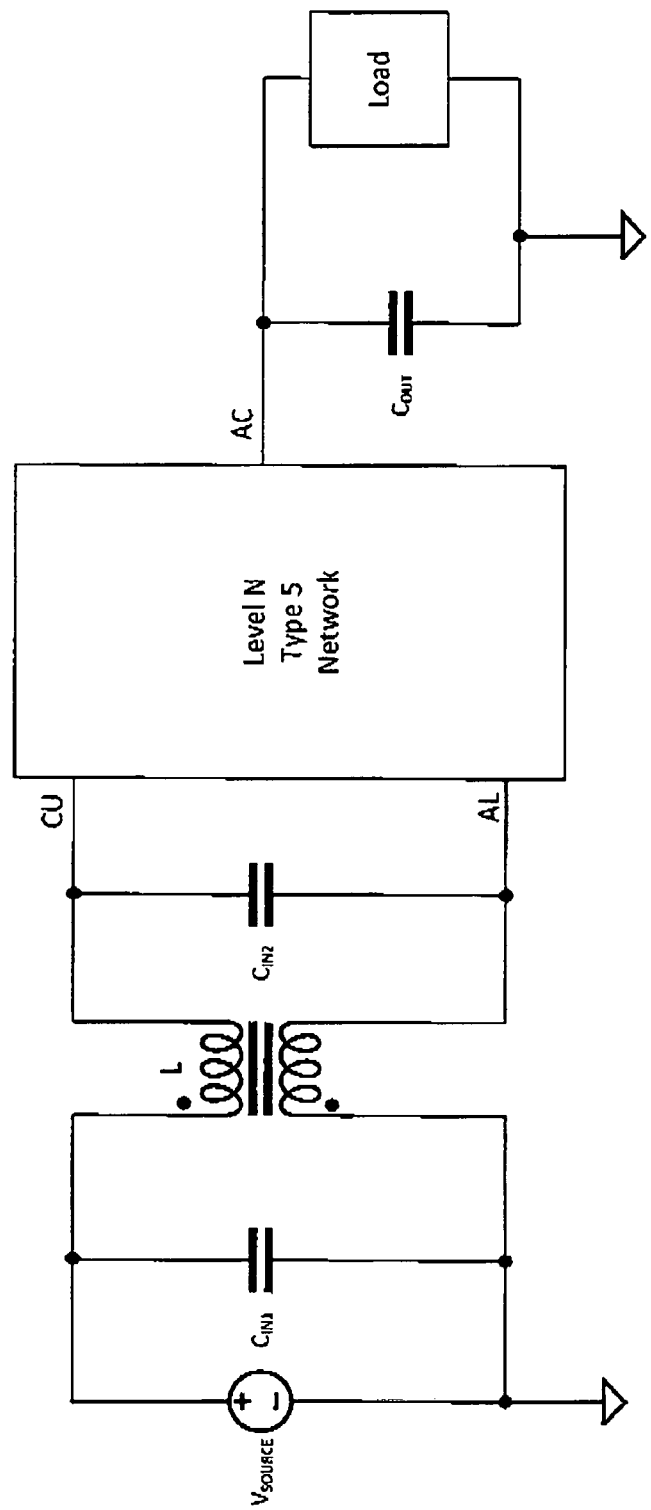
FIG. 25 illustrates a fixed frequency level N type 5 network implementation of a buck converter having non-pulsating terminal currents according to the subject invention.

Another embodiment of the subject invention is illustrated in FIG. 22 which is a buck embodiment implemented with a level N type 5 network, according to the subject invention. FIG. 23 illustrates another embodiment of the subject invention which is a boost embodiment implemented with a level N type 5 network. FIG. 24 is a buck boost embodiment of the subject invention which accomplishes voltage inversion. FIG. 25 is a buck embodiment of the subject invention wherein the buck inductor is placed opposite to the AC terminal to achieve non-pulsating terminal currents for all terminals in the manner of the Cuk converter.

CONCLUSION, RAMIFICATIONS, AND SCOPE OF INVENTION

Thus the reader will see that zero voltage switching can be achieved flying capacitor converters by operating at a variable switching frequency in order to reverse the magnetizing current in the inductor in each switching cycle such that the magnetizing energy in the inductor is available for driving zero voltage transitions for all of the switches in a flying capacitor converter for each switching transition. Also, by adding a winding to the inductor to create a coupled inductor, zero voltage switching flying capacitor converters are created operable at fixed frequency and with galvanic isolation between source and load. Also, by adding a small auxiliary inductor, a small auxiliary capacitor, and an auxiliary switch to each switch section of a flying capacitor converter a fixed frequency zero voltage switching flying capacitor converter is created utilizing a single winding main inductor.

While my above description contains many specificities, these should not be construed as limitations on the scope of the invention, but rather, as exemplifications or preferred embodiments thereof. Many other variations are possible. For example, circuits similar to those illustrated but with switches implemented with power transistors of all sorts should be considered embodiments of the subject invention. Circuits similar to those illustrated but with secondary switches implemented with diode rectifiers and power transistors should be considered embodiments of the subject invention. Circuits having coupled inductors with multiple secondaries, although not illustrated, should be considered embodiments of the subject invention. In many of the circuits shown there are series connected elements and series connected networks. The order of placement of circuit elements or networks in series connected networks is inconsequential in the illustrations shown so that series elements or networks in the illustrated circuits with circuit elements or networks reversed or placed in an entirely different order within series connected networks are equivalent to the circuits illustrated and shall be considered embodiments of the subject invention. In the illustrations buck, boost, non-isolated flyback, coupled buck, and coupled boost converters were shown as examples of zero voltage switching flying capacitor power converters having the necessary properties for application of the subject invention. These are examples of three terminal and isolated four terminal power converters which can be generalized and applied to many other circuit topologies in order to obtain the benefits of the subject matter taught in this invention, and, as such, these many other circuit topologies shall be considered embodiments of the subject invention.

Accordingly, the scope of the invention should be determined not by the embodiments illustrated, but by the appended claims and their legal equivalents.

What is claimed is:

1. A zero voltage switching flying capacitor power converter comprising,
   an input/output having a first terminal and a second terminal coupleable to a substantially dc voltage source/sink,
   an output/input having a first terminal and a second terminal coupleable to a variable voltage sink/source,
   a level 1 type 3 network having a CU terminal connected to said first terminal of said input/output, an AL terminal connected to said second terminal of said input/output, and an AC terminal, comprising a series connection of,
      a first type 1 network having a CU terminal connected to said CU terminal of said level 1 type 3 network, an AL terminal connected to said AL terminal of said level 1 type 3 network, an AU terminal, and a CL terminal, comprising,
         a first main switch having a C terminal connected to said CU terminal of said first type 1 network and an A terminal connected to said AU terminal of said first type 1 network,
         a first flying capacitor having an A terminal connected to said AU terminal of said first type 1 network and a C terminal connected to said CL terminal of said first type 1 network,
         and a second main switch operable substantially in anti-synchronization to said first main switch having an A terminal connected to said AL terminal of said first type 1 network and a C terminal connected to said CL terminal of said first type 1 network,
      a type 2 network having a CU terminal connected to said AU terminal of said first type 1 network, an AL terminal connected to said CL terminal of said first type 1 network, and an AC terminal connected to said AC terminal of said level 1 type 3 network, comprising,
         a third main switch having a C terminal connected to said CU terminal of said type 2 network and an A terminal connected to said AC terminal of said type 2 network,
         and a fourth main switch operable substantially in anti-synchronization to said third main switch having a C terminal connected to said AC terminal of said type 2 network and an A terminal connected to said AL terminal of said type 2 network,
      and an inductor having a first terminal connected to said AC terminal of said level 1 type 3 network and a second terminal connected to said first terminal of said output/input,
   whereby said main switches operate with a variable switching period sufficiently long to enable the magnetizing current in said inductor to reverse direction during each main switch operating state making available stored magnetizing energy in said inductor to drive zero voltage transition switching for all of said switches.

2. The zero voltage switching flying capacitor power converter of claim 1 further comprising a second type 1 network connected in series between said first type 1 network and said type 2 network,
   whereby said second type 1 network together with said first type 1 network and said type 2 network form a level 2 type 3 network.

3. The zero voltage switching flying capacitor power converter of claim 1 further comprising multiple type 1 networks connected in series between said first type 1 network and said type 2 network,
   whereby said multiple type 1 networks together with said first type 1 network and said type 2 network form a level N type 3 network.

4. A zero voltage switching flying capacitor power converter comprising,
   a first input/output having a first terminal and a second terminal coupleable to a substantially dc voltage source/sink,
   an output/input having a first terminal and a second terminal coupleable to a variable voltage sink/source,
   a bulk energy storage capacitor having an A terminal and a C terminal connected to said second terminal of said output/input,
   a level 1 type 3 network having a CU terminal connected to said A terminal of said bulk energy storage capacitor, an AL terminal connected to said C terminal of said bulk energy storage capacitor, and an AC terminal, comprising a series connection of,
      a first type 1 network having a CU terminal connected to said CU terminal of said level 1 type 3 network, an AL terminal connected to said AL terminal of said level 1 type 3 network, an AU terminal, and a CL terminal, comprising,
         a first main switch having a C terminal connected to said CU terminal of said first type 1 network and an A terminal connected to said AU terminal of said first type 1 network,
         a first flying capacitor having an A terminal connected to said AU terminal of said first type 1 network and a C terminal connected to said CL terminal of said first type 1 network,
         and a second main switch operable substantially in anti-synchronization to said first main switch having an A terminal connected to said AL terminal of said first type 1 network and a C terminal connected to said CL terminal of said first type 1 network,
      a type 2 network having a CU terminal connected to said AU terminal of said first type 1 network, an AL terminal connected to said CL terminal of said first type 1 network, and an AC terminal connected to said AC terminal of said level 1 type 3 network, comprising,
         a third main switch having a C terminal connected to said CU terminal of said type 2 network and an A terminal connected to said AC terminal of said type 2 network,
         and a fourth main switch operable substantially in anti-synchronization to said third main switch having a C terminal connected to said AC terminal of said type 2 network and an A terminal connected to said AL terminal of said type 2 network,
      a coupled inductor having a primary winding and a first secondary winding wherein said primary winding has a dotted terminal connected to said AC terminal of said level 1 type 3 network and an undotted terminal connected to said first terminal of said output/input and said first secondary winding has a dotted terminal and an undotted terminal,
a first source/load network having a dotted terminal connected to said dotted terminal of said first secondary winding of said coupled inductor and an undotted terminal connected to said undotted terminal of said first secondary winding of said coupled inductor, comprising,
  a first source/load capacitor having an A terminal connected to said undotted terminal of said first source load network and a C terminal connected to said second terminal of said first input/output,
  a first source/load switch having an A terminal connected to said C terminal of said first source load capacitor and a C terminal connected to said dotted terminal of said first source/load network,
  a second source/load switch having an A terminal connected to said dotted terminal of said first source/load network and a C terminal connected to said first terminal of said first input/output,
  and a second source/load capacitor having an A terminal connected to said first terminal of said first input/output and a C terminal connected to said second terminal of said first input/output,
whereby zero voltage switching is achieved for all of said switches operating in a steady state condition at a fixed switching period driven by stored energy in a magnetizing inductance and/or stored energy in a leakage inductance of said coupled inductor.

5. The zero voltage switching flying capacitor power converter of claim 4 further comprising a second type 1 network connected in series between said first type 1 network and said type 2 network,
whereby said second type 1 network together with said first type 1 network and said type 2 network form a level 2 type 3 network.

6. The voltage switching flying capacitor power converter of claim 4 further comprising multiple type 1 networks connected in series between said first type 1 network and said type 2 network, whereby said multiple type 1 networks together with said first type 1 network and said type 2 network form a level N type 3 network.

7. The zero voltage switching flying capacitor power converter of claim 4 further comprising multiple coupled inductor secondary windings and multiple source/load networks.

8. A zero voltage switching flying capacitor power converter comprising,
an input/output having a first terminal and a second terminal coupleable to a substantially dc voltage source/sink,
an output/input having a first terminal and a second terminal coupleable to a variable voltage sink/source,
a level 1 type 5 network having a CU terminal connected to said first terminal of said input/output, an AL terminal connected to said second terminal of said input/output, and an AC terminal, comprising a series connection of,
  a first type 4 network having a CU terminal connected to said CU terminal of said level 1 type 5 network, an AL terminal connected to said AL terminal of said level 1 type 5 network, an AU terminal, and a CL terminal, comprising,
    a first main switch network having a C terminal connected to said CU terminal of said first type 4 network and an A terminal connected to said AU terminal of said first type 4 network, comprising,
      a first main switch having an A terminal connected to said A terminal of said first main switch network and a C terminal,
      a first auxiliary switch having an A terminal connected to said C terminal of said first main switch and a C terminal,
      a first auxiliary capacitor having an A terminal connected to said C terminal of said first auxiliary switch and a C terminal connected to said C terminal of said first main switch network,
      a first auxiliary inductor having a first terminal connected to said C terminal of said first main switch and a second terminal connected to said C terminal of said first main switch network,
    a first flying capacitor having an A terminal connected to said AU terminal of said first type 4 network and a C terminal connected to said CL terminal of said first type 4 network,
    and a second main switch operable substantially in anti-synchronization to said first main switch having an A terminal connected to said AL terminal of said first type 4 network and a C terminal connected to said CL terminal of said first type 4 network,
  and a type 6 network having a CU terminal connected to said AU terminal of said first type 4 network, an AL terminal connected to said CL terminal of said first type 4 network, and an AC terminal connected to said AC terminal of said level 1 type 5 network, comprising,
    a second main switch network having a C terminal connected to said CU terminal of said first type 6 network and an A terminal connected to said AU terminal of said first type 6 network, comprising,
      a third main switch having an A terminal connected to said A terminal of said second main switch network and a C terminal,
      a second auxiliary switch having an A terminal connected to said C terminal of said third main switch and a C terminal,
      a second auxiliary capacitor having an A terminal connected to said C terminal of said second auxiliary switch and a C terminal connected to said C terminal of said second main switch network,
      a second auxiliary inductor having a first terminal connected to said C terminal of said third main switch and a second terminal connected to said C terminal of said second main switch network,
    and a fourth main switch operable substantially in anti-synchronization to said third main switch having a C terminal connected to said AC terminal of said type 2 network and an A terminal connected to said AL terminal of said type 2 network,
  and an inductor having a first terminal connected to said AC terminal of said level 1 type 5 network and a second terminal connected to said first terminal of said output/input,
whereby said main switches operate with a fixed switching period and said inductor and said auxiliary inductors provide stored magnetizing energy for driving zero voltage switching transitions for all of said switches.

9. The zero voltage switching flying capacitor power converter of claim 8 further comprising a second type 4 network connected in series between said first type 4 network and said type 6 network, whereby said second type 4 network together with said first type 4 network and said type 6 network form a level 2 type 5 network.

10. The zero voltage switching flying capacitor power converter of claim 8 further comprising multiple type 4 networks connected in series between said first type 4 network and said type 6 network, whereby said multiple type 4 networks together with said first type 4 network and said type 6 network form a level N type 5 network.

\* \* \* \* \*